United States Patent
Gomadam et al.

(10) Patent No.: US 10,148,557 B2
(45) Date of Patent: Dec. 4, 2018

(54) LINK MAINTENANCE IN POINT-TO-POINT WIRELESS COMMUNICATION NETWORKS

(71) Applicant: Facebook, Inc., Menlo Park, CA (US)

(72) Inventors: Krishna Gomadam, San Jose, CA (US); Djordje Tujkovic, Mountain View, CA (US); Sanjai Kohli, Manhattan Beach, CA (US)

(73) Assignee: Facebook, Inc., Menlo Park, CA (US)

( * ) Notice: Subject to any disclaimer, the term of this patent is extended or adjusted under 35 U.S.C. 154(b) by 17 days.

(21) Appl. No.: 15/382,682

(22) Filed: Dec. 18, 2016

(65) Prior Publication Data

US 2017/0195215 A1 Jul. 6, 2017

Related U.S. Application Data

(60) Provisional application No. 62/273,381, filed on Dec. 30, 2015.

(51) Int. Cl.
*H04B 7/00* (2006.01)
*H04L 12/721* (2013.01)
(Continued)

(52) U.S. Cl.
CPC .............. *H04L 45/26* (2013.01); *H04L 41/12* (2013.01); *H04L 43/08* (2013.01)

(58) Field of Classification Search
CPC ..... H04W 40/02; H04W 40/06; H04W 40/12; H04W 40/24; H04W 40/244; H04W 40/28
(Continued)

(56) References Cited

U.S. PATENT DOCUMENTS

| 8,040,856 B2* | 10/2011 | Xia | H04B 7/0617 |
| | | | 370/335 |
| 8,068,844 B2* | 11/2011 | Li | H01Q 1/246 |
| | | | 455/450 |

(Continued)

FOREIGN PATENT DOCUMENTS

| WO | WO2013165149 | 11/2013 |
| WO | WO2014104453 | 7/2014 |

OTHER PUBLICATIONS

PCT/US2016/067854; PCT International Search Report, dated May 8, 2017.
(Continued)

*Primary Examiner* — Dmitry Levitan
(74) *Attorney, Agent, or Firm* — Brian R. Short

(57) ABSTRACT

A wireless communication network includes a transmitting node and a receiving node configured to transmit and receive packets between the transmitting node and the receiving node through one or more of a plurality of predetermined micro-routes is disclosed. For an embodiment, the transmitting node is configured to retrieve a first micro-route, transmit packets in a first transmit beamforming direction associated with the first micro-route, transmit packets including one or more training signals in a second transmit beamforming direction associated with a second micro-route of the plurality of predetermined micro-routes that is different than the first transmit beamforming direction associated with the first micro-route, and receive feedback from the receiving node indicating that the second micro-route provides a better communication link than the first micro-route.

18 Claims, 19 Drawing Sheets

(51) Int. Cl.
*H04L 12/24* (2006.01)
*H04L 12/26* (2006.01)

(58) Field of Classification Search
USPC .................. 370/310, 328, 339, 400, 465
See application file for complete search history.

(56) References Cited

U.S. PATENT DOCUMENTS

| | | | | |
|---|---|---|---|---|
| 8,116,819 | B2* | 2/2012 | Niu | H01Q 1/125 |
| | | | | 342/372 |
| 8,422,961 | B2* | 4/2013 | Kafle | H01Q 3/26 |
| | | | | 342/368 |
| 8,755,302 | B2* | 6/2014 | Shao | H04W 72/02 |
| | | | | 370/254 |
| 8,830,943 | B2* | 9/2014 | Negus | H04B 7/0691 |
| | | | | 370/235 |
| 9,215,644 | B2 | 12/2015 | Kohli | |
| 9,277,480 | B2 | 3/2016 | Kohli | |
| 9,294,163 | B2* | 3/2016 | Kim | H04B 7/0408 |
| 9,648,547 | B1* | 5/2017 | Hart | H04W 48/10 |
| 9,794,854 | B2* | 10/2017 | Hart | H04W 40/06 |
| 9,893,786 | B2* | 2/2018 | Kasher | H04B 7/0617 |
| 9,998,184 | B2* | 6/2018 | Kasher | H04B 7/043 |
| 2007/0263572 | A1 | 11/2007 | Ren et al. | |
| 2009/0298502 | A1 | 12/2009 | Hagerman et al. | |
| 2010/0080119 | A1 | 4/2010 | Ansorge | |
| 2011/0110453 | A1 | 5/2011 | Prasad et al. | |
| 2012/0009880 | A1 | 1/2012 | Trainin et al. | |
| 2012/0287797 | A1* | 11/2012 | Basson | H04W 16/28 |
| | | | | 370/252 |
| 2013/0089042 | A1 | 4/2013 | Negus | |
| 2013/0095874 | A1 | 4/2013 | Moshfeghi | |
| 2013/0121178 | A1 | 5/2013 | Mainaud et al. | |
| 2013/0329718 | A1 | 12/2013 | Liu et al. | |
| 2014/0286156 | A1 | 9/2014 | Kohli | |
| 2014/0286251 | A1 | 9/2014 | Kohli | |
| 2014/0341310 | A1 | 11/2014 | Rahman et al. | |
| 2015/0230263 | A1 | 8/2015 | Roy et al. | |
| 2015/0244769 | A1 | 8/2015 | Khaimov | |
| 2016/0020844 | A1* | 1/2016 | Hart | H04B 7/0617 |
| | | | | 370/280 |
| 2017/0156066 | A1* | 6/2017 | Shiotani | H04B 17/318 |
| 2018/0084446 | A1 | 3/2018 | Li et al. | |

OTHER PUBLICATIONS

PCT/US2016/067854; Written Opinion of the International Searching Authority, dated May 8, 2017.

* cited by examiner

Multiple Beam Direction Settings of First Node

Multiple Beam Direction Settings of Second Node

| | 1 | 2 | 3 | 4 | 5 | 6 | 7 | 8 | 9 | 10 | 11 | 12 |
|---|---|---|---|---|---|---|---|---|---|---|---|---|
| 1 | X | X | X | X | X | X | X | X | X | X | X | X |
| 2 | X | V7 | X | V8 | X | V9 | X | X | X | X | X | X |
| 3 | X | X | X | X | X | X | X | X | X | X | X | X |
| 4 | V6 | X | X | X | X | V4 | X | X | X | X | X | X |
| 5 | X | X | X | X | X | X | X | X | X | X | X | X |
| 6 | X | X | X | V2 | X | V1 | X | V3 | X | X | X | X |
| 7 | X | X | X | X | X | X | X | X | X | X | X | X |
| 8 | X | X | X | X | X | V5 | X | X | X | X | X | X |
| 9 | X | X | X | X | X | X | X | X | X | X | X | X |
| 10 | X | X | V12 | X | X | X | X | X | X | X | X | X |
| 11 | X | X | V11 | V13 | X | X | X | X | X | V10 | X | X |
| 12 | X | X | X | X | X | X | X | X | X | X | X | X |

FIGURE 10

Multiple Beam Direction Settings of First Node

|   | 1 | 2 | 3 | 4 | 5 | 6 | 7 | 8 | 9 | 10 | 11 | 12 |
|---|---|---|---|---|---|---|---|---|---|----|----|----|
| 1 | X | X | X | X | X | X | X | X | X | X | X | X |
| 2 | X | V7 | X | V8 | X | V9 | X | X | X | X | X | X |
| 3 | X | X | X | X | X | X | X | X | X | X | X | X |
| 4 | V6 | X | X | X | X | V4 | X | X | X | X | X | X |
| 5 | X | X | X | X | X | X | X | X | X | X | X | X |
| 6 | X | X | X | V2 | X | V1 | X | V3 | X | X | X | X |
| 7 | X | X | X | X | X | X | X | X | X | X | X | X |
| 8 | X | X | X | X | X | V5 | X | X | X | X | X | X |
| 9 | X | X | X | X | X | X | X | X | X | X | X | X |
| 10 | X | X | V12 | X | X | X | X | X | X | X | X | X |
| 11 | X | X | V11 | V13 | X | X | X | X | X | V10 | X | X |
| 12 | X | X | X | X | X | X | X | X | X | X | X | X |

Multiple Beam Direction Settings of Second Node

FIGURE 12

At time = T1

| Micro-route | Measure Link Quality | Measured Level of Correlation with Micro-route1 |
|---|---|---|
| Micro-route 1 | Q1 | XXXX |
| Micro-route 2 | Q2 | C1 |
| Micro-route 3 | Q3 | C2 |
| Micro-route 4 | Q4 | C3 |
| Micro-route 5 | Q5 | C4 |

At time = T2

| Micro-route | Measure Link Quality | Measured Level of Correlation with Micro-route1 |
|---|---|---|
| Micro-route 1 | Q1 | XXXX |
| Micro-route 2 | Q2 | C1' |
| Micro-route 3 | Q3 | C2' |
| Micro-route 4 | Q4 | C3' |
| Micro-route 5 | Q5 | C4' |

FIGURE 14

LINK MAINTENANCE IN POINT-TO-POINT WIRELESS COMMUNICATION NETWORKS

RELATED APPLICATIONS

This patent application claims priority to U.S. Provisional Patent Application Ser. No. 62/273,381, filed Dec. 30, 2015.

TECHNICAL FIELD

The disclosed embodiments relate to wireless communication networks and in particular to maintaining connections between nodes in wireless communication networks.

BACKGROUND

Most IP traffic is carried on fiber optic or cable networks. This works well when the cable infrastructure is already present or can be easily installed. However, there are many locations where it is either not practical or too expensive to dig up streets or run cables overhead. To alleviate this problem, wireless networks have been proposed to extend the reach of the network to locations that cannot be connected by physical cables.

In some wireless networks, beamforming is used on the transmitter and/or receiver side to improve the communication link. However, due to the changing nature of radio frequency communications, the beamforming parameters used by the transmitter and receiver are not static. Given this problem, there is a need for improved techniques to dynamically select new beamforming parameters to improve communication between nodes in wireless communication network.

SUMMARY

An embodiment includes a wireless communication network. The wireless communication network includes a transmitting node and a receiving node configured to transmit and receive packets between the transmitting node and the receiving node through one or more of a plurality of predetermined micro-routes, wherein each of the plurality of predetermined micro-routes is determined by a transmit beamforming direction and a receive beamforming direction. The transmitting node is configured to retrieve a first micro-route of the plurality of predetermined micro-routes, transmit packets in a first transmit beamforming direction associated with the first micro-route between the transmitting node and the receiving node, transmit packets including one or more training signals in a second transmit beamforming direction associated with a second micro-route of the plurality of predetermined micro-routes that is different than the first transmit beamforming direction associated with the first micro-route, and receive feedback from the receiving node indicating that the second micro-route corresponding with a transmit/receive beamforming pair of the second transmit beamforming direction and a second receive beamforming direction provides a better communication link than a transmit/receive beamforming pair of the first transmit beamforming direction and a first receive beamforming direction of the first micro-route.

An embodiment includes a method. The method includes transmitting, by a transmitting node, transmit packets, and receiving, by a receiving node, receive packets between the transmitting node and the receiving node through one or more of a plurality of predetermined micro-routes, wherein each the plurality of predetermined micro-routes is determined by a transmit beamforming direction and a receive beamforming direction, retrieving, by the transmitting node, a first micro-route of the plurality of predetermined micro-routes, transmitting, by the transmitting node, packets in a first transmit beamforming direction associated with the first micro-route between the transmitting node and the receiving node, transmitting, by the transmitting node, packets including one or more training signals in a second transmit beamforming direction associated with a second micro-route of the plurality of predetermined micro-routes that is different than the first transmit beamforming direction associated with the first micro-route, and receiving, by the transmitting node, feedback from the receiving node indicating that the second micro-route corresponding with a transmit/receive beamforming pair of the second transmit beamforming direction and a second receive beamforming direction provides a better communication link than a transmit/receive beamforming pair of the first transmit beamforming direction and a first receive beamforming direction of the first micro-route.

The disclosed embodiments relate to systems and methods for determining transmit and receive beamforming directions between nodes in a point-to-point wireless communication network. In one embodiment, training signals are appended to IP data packets that are sent on a communication link between a transmitting node and a receiving node. The training signals are sent in a combination of transmit beamforming directions. A receiving node is programmed to listen for the training packets in a number of different receive beamforming directions. If a training signal is received using a transmit/receive beamforming pair that provides better channel metrics (e.g., signal-to-noise ratio, bit error rate, or the like) than those obtained with a previously used beamforming pair, the receiving node signals the transmitting node that the transmit/receive beamforming pair used to communicate between them should be changed.

In some embodiments, the transmit/receive beamforming pairs that are used to test the training signals are direction pairs that were previously determined to complete a communication link between the nodes. If a receiving node becomes disconnected or unsynchronized from the other nodes in the network, the receiving node begins listening for training packets in each of a number of receive beamforming directions until a training packet is detected.

In accordance with other embodiments, an IP data packet is generated having a data portion and one or more training signals that are to be transmitted in a number of different transmit beamforming directions. In some embodiments, the transmit beamforming directions are those directions in which a communication link has previously been completed with the receiver.

BRIEF DESCRIPTION OF THE DRAWINGS

FIG. 10 shows a table of measured qualities of micro-routes, according to an embodiment.

FIG. 12 shows a table of measured qualities of micro-routes, and further shows measured qualities that could represent a primary lobe and side lobes of a beam-formed signal, according to an embodiment.

FIG. 14 shows a first table that lists a measured link quality for each of five micro-routes, and lists a level of correlation with a first micro-route at a time T1, a second table that lists a measured link quality for each of the five micro-routes, and lists a level of correlation with a first micro-route at a time T2, according to an embodiment.

DETAILED DESCRIPTION

Figure 1:
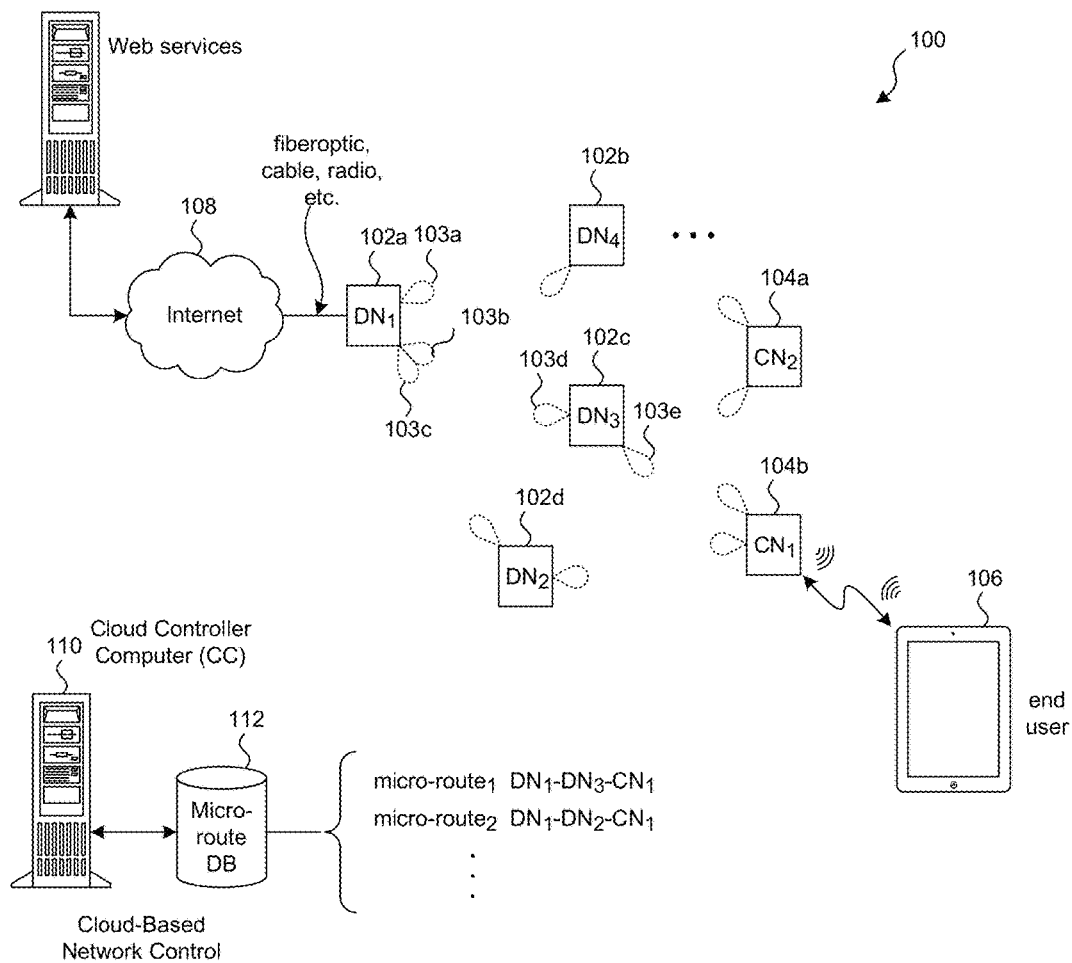
FIG. 1 illustrates a point-to-point wireless communication network in accordance with some disclosed embodiments.

FIG. 1 shows one embodiment of a point-to-point wireless communication network. The network 100 includes a number of destination nodes (DN) 102a, 102b, 102c, 102d, etc. and a number of client nodes (CN) 104a, 104b, etc. The destination nodes transmit IP packets between themselves and the client nodes. The client nodes transmit and receive IP packets between themselves and the destination nodes as well as to a number of end users 106 (such as, but not limited to, wireless enabled devices including computers, tablets, smart phones, household appliances, or any other device capable of transmitting and receiving wireless IP data). The destination nodes 102 are typically mounted on utility poles or on buildings and transmit point-to-point wireless signals approximately 200-300 meters, depending on conditions. The client nodes 104 are generally located in retail/office establishments or in homes in order to transmit and receive IP packets to and from the end users. In one embodiment, the IP packets are sent according to a standardized protocol such as IEEE 802.11ad. However, it will be appreciated that any number of other IP protocols such as WiMAX 802.16 could be used.

In the network 100, at least one destination node (e.g., node 102a) is coupled to a physical cable that carries IP data to and from a computer communication link 108 (e.g., the Internet or a private communication link). IP packets that are destined for an end user 106 are received from the communication link and are transmitted via one or more routes to the client node 104b, which is in communication with the end user 106. For example, packets may be sent via a route including nodes $DN_1 \rightarrow DN_3 \rightarrow CN_1$ or via a second route including nodes $DN_1 \rightarrow DN_2 \rightarrow CN_1$ depending on the radio frequency path conditions that may exist at any time.

In one embodiment, transmissions are carried on a non-regulated 60 GHz radio frequency spectrum band. At these frequencies, the ability to transmit and receive packets is easily influenced by changing atmospheric conditions (wind, rain, etc.) or by interfering objects (e.g., buses, tree limbs, or other objects passing in and out of the line of sight). Therefore, the best route to complete a communication link between a transmitting and a receiving node in the network may change over time.

In the embodiment shown, a cloud controller computer 110 includes a database 112 that stores a list of possible routes that have been determined to complete a communication link between the various nodes of the network. The cloud computer 110 can communicate with each of the nodes by sending packets that are addressed to the nodes in order to control the overall operation of the network. In one embodiment, when an IP packet is to be sent to an end user on the network, the cloud computer informs the nodes which route to use.

In order to improve the communication path between each of the nodes, to reduce interference, and to increase the throughput of the network, the destination and client nodes generally include multiple antennas that can be used to control the transmit and receive directions of the node by beamforming. As will be appreciated by those skilled in the art of radio frequency communications, the radio frequency signals transmitted by each of the antennas can be selectively delayed by beamforming techniques in order to direct the main lobe (i.e., the bulk of the transmitted signal power) in a desired direction. Similarly, signals received by the antennas can be delayed and summed using beamforming techniques to change the effective listening direction of the receiver. In the embodiment shown in FIG. 1, destination node $DN_1$ 102a can beamform its transmitted and received signals in a number of different directions 103a, 103b, 103c. Similarly destination node $DN_3$ 102c can beamform its transmitted and received signals in directions 103d and 103e. The best communication link between destination nodes $DN_1$ and $DN_3$ is determined by selecting the best transmit and receive beamforming directions for each node in order to complete the communication link. The best communication link between nodes may not always be when the transmit and receive beamforming directions are aligned along the line of sight.

Figure 2:
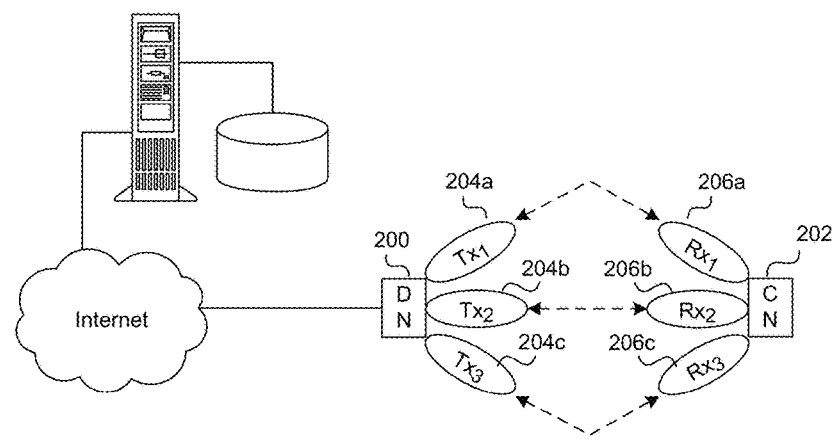
FIG. 2 illustrates a number of possible transmit and receive beamforming directions between a destination node and a client node in a wireless communication network in accordance with some disclosed embodiments.

As discussed above, the best possible transmit path between two nodes in a point-to-point wireless network may vary over time. FIG. 2 shows a destination node 200 and a client node 202 that can communicate via a number of different micro-routes defined by a corresponding number of beamforming direction pairs. A micro-route can be physical path that represents the line of sight propagation of an electromagnetic wave or a path corresponding to a specific reflection. It can also be a virtual route corresponding to a beamforming vector. Here the virtual route can be composed of two or more physical paths appropriately phase-combined at the transmitter (Tx) and/or the receiver (Rx). In the example shown, the destination node 200 can communicate with the client node 202 using a number of beamforming directions 204a, 204b, or 204c. Similarly, the client node 202 can communicate with the destination node 200 in a number of beamforming directions 206a, 206b, or 206c. In practice, each node may have a greater number of transmit and receive beamforming directions (usually a prime number but not required). Not all beamforming directions may allow a communication link to be completed between the nodes. In the example shown, the destination node 200 and the client node 202 communicate using the TX/RX beamforming pair 204b, 206b.

At some point in time, atmospheric conditions may change or an obstacle (bus, tree limb, etc.) may come between the nodes 200 and 202 such that the communication link that uses the TX/RX beamforming pair 204b, 206b is not the optimal pair to use for communication between the links. In this case, the nodes should switch to another TX/RX beamforming pair (micro-route) that has been determined to complete a communication link between the nodes. For example, the TX/RX beamforming pair 204a, 206a may provide a more robust communication link than the beamforming pair that is currently in use.

In one embodiment, if a communication link between the nodes is broken or suspended, then each of the nodes in the link will try to reestablish the link using one or more of the remaining micro-routes that have been determined to work between the nodes. Each of the nodes contains a list of micro-routes (e.g., beamforming directions) that can be tried to determine whether a link can be reestablished. The links in the list are tried according to a predetermined protocol in order to determine whether the link can be re-established. If a link can be reestablished via a new micro-route (e.g., using the TX/RX beamforming pair 204a, 206a), then communication can continue using the new micro-route.

In some cases, a particular micro-route may provide a better communication link than the one that is currently in use even though the current link is not broken or disrupted. In one embodiment, each micro-route that has been determined to complete a communication link between the nodes is periodically tested. Metrics for the alternate micro-routes, such as bit error rate, signal-to-noise ratio, signal-to-interference ratio or others, are determined for the alternate micro-routes and compared with metrics for the micro-route that is currently in use. If another micro-route has better metrics than the micro-route that is currently in use, then the nodes will switch to the other micro-route.

Figure 3:
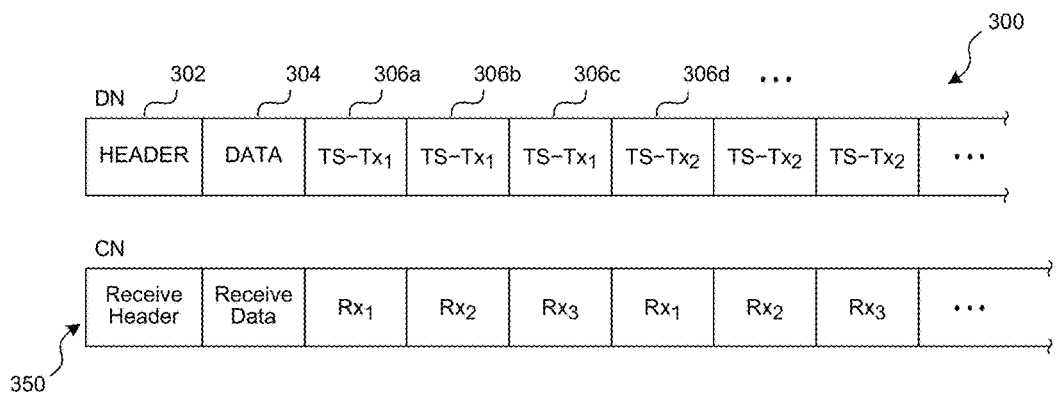
FIG. 3 illustrates how training signals are appended to an IP data packet for transmission and reception with different beamforming direction pairs in accordance with some disclosed embodiments.

FIG. 3 illustrates one mechanism by which the nodes of a point-to-point wireless communication network can periodically test alternative micro-routes that have been determined to be useful in communicating between the nodes. In this embodiment, test signals are appended to IP data packets that are transmitted between the nodes. The test signals are transmitted and received using the TX/RX beamforming pairs for the alternative micro-routes that have been identified to complete the communication link between the nodes.

In the example shown, an IP data packet 300 transmitted from a node includes header information 302 and data information 304, as is conventional in packetized IP communication protocols. In addition, the IP data packet 300 includes a number of training signals (TS) 306a, 306b, 306c . . . that are transmitted in different beamforming directions.

In one embodiment, if the transmitting node has N possible transmit beamforming directions that will work in micro-routes with a receiving node and the receiving node has N possible receive beamforming directions, then the data packet includes $N^2$ training signals 306 where a training signal is transmitted N times in each transmit beamforming direction. In the example shown in FIGS. 2 and 3, transmitting destination node 200 has three transmit beamforming directions indicated by TX1, TX2, and TX3. Similarly, receiving client node 202 has three receive beamforming directions indicated by RX1, RX2, and RX3.

As shown, a signal 350 is received by the receiving node on the current micro-route that allows the receiving node to capture the header information and data in the IP data packet 300. The receiving node then sequentially changes its receive beamforming directions to determine whether it can detect the training signals being sent from the transmitter with better link metrics. In the example illustrated, the transmitter and receiver each have three possible transmit and receive beamforming directions. Therefore the training signals are transmitted three times in direction TX1, followed by three times in direction TX2 and three times in direction TX3. This allows the receiving node to test its receive beamforming directions RX1, RX2, RX3 against each of the possible transmit beamforming directions.

If a training signal is detected, the received signal is analyzed to determine whether the link metrics associated with the received signal are better than those of the current micro-route in use. If so, the receiving node sends a signal to the transmitting node that the current micro-route should be changed to a new micro-route using the TX/RX beamforming pair that provides the best communication link.

In another embodiment, not every combination of transmit and receive beamforming directions is compared to the others to determine the best possible TX/RX beamforming pair. In this embodiment, training signals are sent via the pre-determined micro-routes that have been determined to complete a communication link between the nodes, e.g., TX1/RX1 (204a-206a), TX2/RX2 (204b-206b), TX3/RX3 (204c-206c). If one of these predetermined micro-routes has better communication metrics than the micro-route that is currently in use between the nodes, then the receiving node sends a signal back to the transmitting node that future communications should take place on this new micro-route.

In yet another embodiment, a predetermined number of transmit and receive beamforming directions are tried that vary slightly from the transmit and receive beamforming directions currently in use. For example, if the transmitting node is transmitting in direction A and the receiving node is receiving in direction B, then the transmitter may send two training signals in directions A+0.5 degrees and A−0.5 degrees (or some other offset). The receiving node will try to receive the training signals with receive beamforming directions B+0.5 degrees and B−0.5 degrees (or some other offset). The number of different beamforming tests to try can be fixed by the communication protocol or can be transmitted to the receiver as part of the IP data packet. If any of these transmit/receive beamforming combinations provide better channel metrics, the receiving node signals the transmitting node and the transmit/receive beamforming pair that is used to communicate between the nodes can be updated.

In one embodiment, not all IP packets transmitted between the nodes include the training signals used to test the alternate micro-routes. For example, the training signals can be sent periodically by packet number (e.g., every 50th or 100th packet). Alternatively, training signals can be appended to, or included in, packets based on time, such as every 50 or 100 milliseconds (rounded to time at which the next packet is sent).

In one embodiment, communication protocols such as IEEE 802.11ad are modified to provide for the addition of the training signals to be periodically added to the IP packets that are transmitted between nodes. In addition, the protocol is adjusted to allow for the nodes to communicate between themselves when a TX/RX beamforming pair is determined to provide a better communication link than the TX/RX beamforming pair associated with the micro-route that is currently in use.

Figure 4:
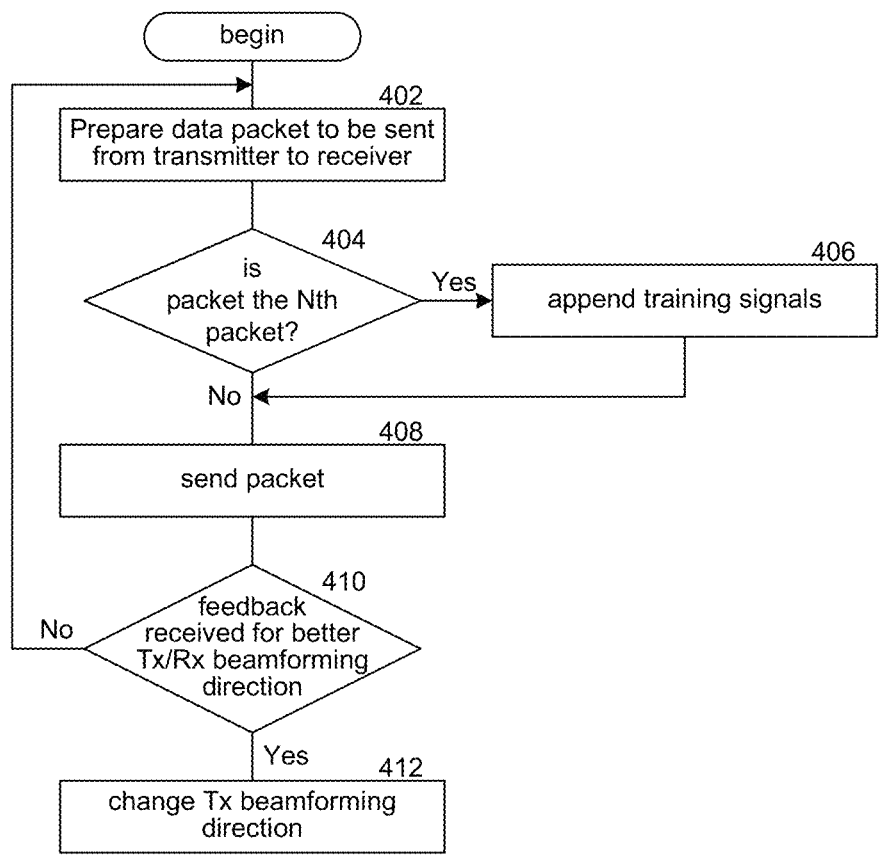
FIG. 4 is a flow diagram of steps performed by a transmitter to append training signals to an IP data packet in accordance with some disclosed embodiments.

FIG. 4 is a flow diagram of steps performed by a processor in a transmitting node in accordance with one embodiment of the disclosed technology. Although the steps are described in a particular order for ease of explanation, it will be appreciated that the steps could be performed in a different order or that different steps could be performed in order to achieve the functionality described.

Beginning at 402, a processor in the node prepares a data packet to be sent from the node to a receiving node. The IP data packet typically includes header information and data that are encoded in a manner that is defined by the communication standard by which the network operates. At 404, the processor determines whether the packet to be sent is the Nth packet that should include training signals. As mentioned above, one embodiment sends training signals periodically such as every 100th packet or at some other interval. If the answer at 404 is no, then the IP data packet is transmitted via the current micro-route to the receiving node at 408.

If the answer at 404 is yes, then at 406 the training signals are appended or otherwise included in the IP data packet before the packet is sent at 408. As discussed above, when the packet including the training signals are sent at 408, the direction of the transmit beamforming is changed with the training signals in order to test the various micro-routes.

At 410, the processor in the transmitting node determines if a feedback signal has been received from the receiving node that indicates that one of the alternate micro-routes provides a better communication link than the current micro-route in use between the nodes. If the answer at 410 is yes, then at 412 the processor in the transmitting node changes its transmit beamforming direction to a direction associated with the better micro-route. If the answer at 410 is no, then processing returns to 402 and the next packet to be transmitted to the receiving node is prepared.

Figure 5:
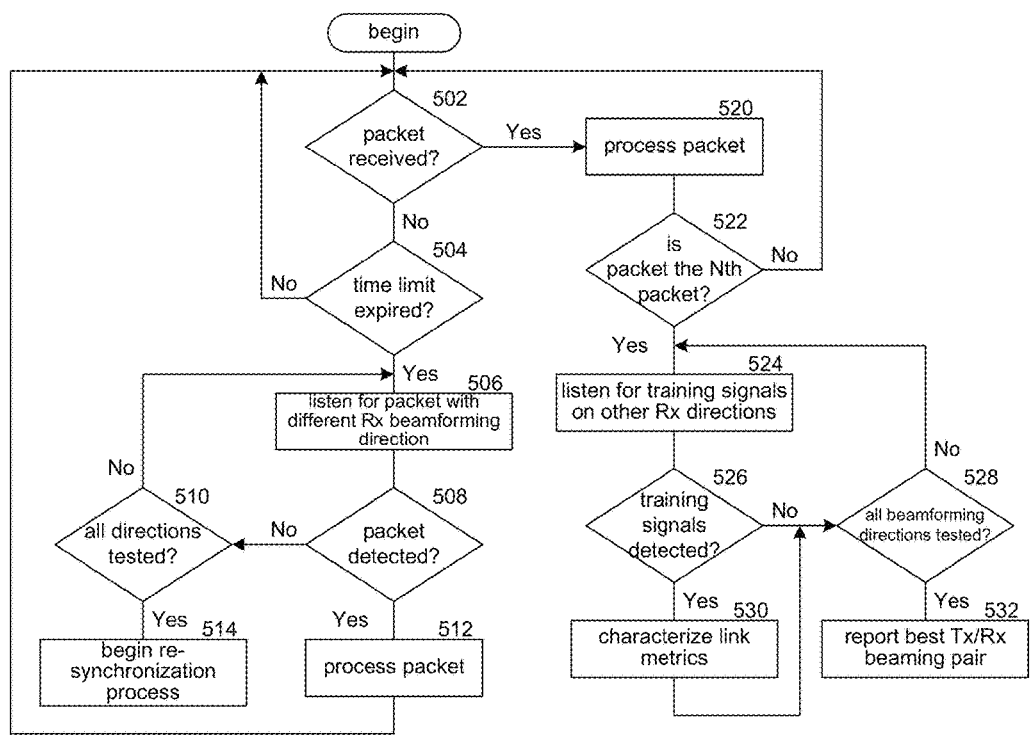
FIG. 5 is a flow diagram of steps performed by a receiver to receive IP data packets and to test other transmit/receive beamforming direction combinations or to re-acquire synchronization with a network if a connection is lost in accordance with some disclosed embodiments.

FIG. 5 shows a number of steps performed by a processor in a receiving node in accordance with some disclosed embodiments. Although the steps are described in a particular order for ease of explanation, it will be appreciated that the steps could be performed in a different order or that different steps could be performed in order to achieve the functionality described.

Beginning at 502, a processor in a receiving node determines if a packet has been received using the receive beamforming direction of a current micro-route. If the answer at 502 is no, then the processor determines if a timeout limit period has expired at 504. The timeout limit period is a predefined period during which at least one signal should have been received from a transmitter in the network. If the timeout limit period has not expired, then processing returns to 502 to check again whether an IP data packet has been received.

If the timeout limit period has expired and the receiving node did not receive an IP data packet, then the processor in the receiver changes its receive beamforming direction to a direction associated with another micro-route. At 508, the processor determines whether an IP data packet is detected. If so, the IP data packet is processed in a conventional manner at 512 before processing returns to 502 in order to receive the next packet.

If no packet is received at 508 after the receiving node has changed its receive beamforming direction, the processor determines at 510 whether all the receive beamforming directions associated with the micro-routes for which a communication link can be established with the transmitting link have been tested. If not, processing returns to step 506 and a new receive beamforming direction associated with a different micro-route is tried.

If all the beamforming directions associated with the different micro-routes have been tried at 510, then the processor in receiving node assumes that a connection has been lost to the network and begins a process of reestablishing synchronization with a transmitting node and determining the best micro-routes to use with the transmitting node at 514.

If an IP data packet is received at 502, the processor in the receiving node processes the packet at 520 in a conventional fashion. In addition, the processor determines at 522 whether the packet received is the Nth packet that should contain the training signals. If the IP data packet is not the Nth packet containing the training signals, then processing returns to 502 to await the arrival of the next IP data packet.

If the packet received is the Nth data packet or otherwise contains the training signals, the data received for the data packet is analyzed using different receive beamforming parameters to, in effect, listen for the training signals in a number of different directions. In one embodiment, the receive beamforming parameters required to change the listening direction of the receiving node are changed in real time before the signals are received at the receiving node's antennas. As will be understood by those of ordinary skill in the radio communications field, the receiving node typically includes a memory in which digitized radio frequency signals are stored. These stored signals are analyzed with different beamforming delays and weights to essentially look at the stored data in different listening directions in order to detect the training signals.

At 526, the processor in the receiving node determines whether any training signals are detected in the various receive beamforming directions. If so, the processor determines one or more link metrics based on the received training signals at 530. Such metrics can include signal-to-noise ratio, signal-to-interference ratio, bit error rates, and other measures of link quality.

If no training signal has been detected or after a detected training signal has been analyzed, the processor determines at 528 whether all the receive beamforming directions have been tested. If not, processing proceeds to 524 and the next receive beamforming direction is tested. If all the beamforming directions have been tested, processing proceeds to 532 where the receiving node informs the transmitting node which transmit/receive beamforming direction pair produced the best communication link metrics. That transmit/receive beamforming pair should then be used in future communications between the nodes.

In one embodiment, the signal sent from the receiving node to the transmitting node tells the transmitting node which transmit beamforming direction it should use as well as which receive beamforming direction the receiver will use. In another embodiment, the signaling scheme is characterized by no signal being sent if the best micro-route is the same as the micro-route that is currently being used. Therefore, if the transmitter does not receive any feedback signal, it continues to use the current micro-route. Of course, other signaling schemes could be used.

In some embodiments, a back-up or default micro-route beamforming pair is used when link conditions change. The list of back-up micro-routes can be predetermined based on previously attempted transmit and receive beamforming directions as well as a corresponding communication link path quality assessment. Such a list can be stored at the nodes or can be stored at the cloud controller computer or both. Alternatively, a back-up micro-route can be defined as the micro-route with the highest percentage "on time" except for the micro-route currently in use. If link conditions vary, both the transmitter and receiver can attempt to switch to a back-up micro-route to maintain communications. Data are kept for each micro-route that is used to communicate between the nodes. The micro-route with the greatest duration or time in use can therefore be selected as the back-up micro-route. The micro-route with the second highest percentage on time can be defined as the second back-up micro-route etc. In this manner, the transmitter and receiver will both know which micro-routes have been successful in allowing communication between the nodes and can try those micro-routes before undertaking a micro-route testing process.

In some cases, nodes in the network may not have any traffic for each other. Therefore, keep alive (KA) message are periodically transmitted between the nodes to test the communication link. Micro-route testing routines or data can be included with the KA messages in order to set the best transmitter and receiver beamforming directions.

An embodiment includes a wireless communication network. The wireless network includes a transmitting node and a receiving node each configured to transmit and receive IP data packets between the transmitting node and the receiving node via a number of micro-routes defined in part by a transmit beamforming direction and a receive beamforming direction, wherein the transmitting node is configured to transmit IP data packets including one or more training signals that are to be transmitted in a direction that is different than a transmit beamforming direction used in a current micro-route between the transmitting node and the receiving node, and wherein the transmitting node is further configured to receive feedback from the receiving node indicating that a transmit/receive beamforming direction pair associated with an alternate micro-route provides a better communication link than a transmit/receive beamforming direction pair associated with the current micro-route and to change the transmit beamforming direction used by the transmitting node to the transmit beamforming direction associated with the alternate micro-route.

For an embodiment, the training signals are included in every Nth IP data packet. For an embodiment, the transmitting node has N transmit beamforming directions and the receiving node has N receive beamforming directions associated with the micro-routes between the nodes, and wherein the IP data packet includes $N^2$ training signals. For an embodiment, the transmitting node and the receiving node have N micro-routes that can complete a communication link between the nodes and wherein the IP data packet includes N training signals. For an embodiment, the number of training signals transmitted is fixed and the beamforming directions of the training signals differ by predetermined increments from the transmit beamforming direction associated with the current micro-route.

An embodiment includes a wireless communication network. The wireless communication network includes a transmitting node and a receiving node each configured to transmit and receive IP data packets between the transmitting node and the receiving node via a number of micro-routes defined in part by a transmit beamforming direction and a receive beamforming direction, wherein the receiving node is configured to receive IP data packets including one or more training signals that are to be received in a direction that is different than a receive beamforming direction used in a current micro-route between the transmitting node and the receiving node, and wherein the receiving node is further configured to send feedback to the transmitting node indicating that a transmit/receive beamforming direction pair associated with an alternate micro-route provides a better communication link than a transmit/receive beamforming direction pair associated with the current micro-route and to change the receive beamforming direction used by the receiving node to a receive beamforming direction associated with the alternate micro-route.

For an embodiment, the transmitting node has N transmit beamforming directions and the receiving node has N receive beamforming directions associated with the micro-routes between the nodes, and wherein the IP data packet includes $N^2$ training signals. For an embodiment, the transmitting node and the receiving node have N micro-routes that can complete a communication link between the nodes and wherein the IP data packet includes N training signals.

An embodiment includes a method of operating a wireless communication network. The method includes transmitting IP data packets between a transmitting node and a receiving node via a number of micro-routes defined in part by a transmit beamforming and a receive beamforming direction, periodically transmitting an IP data packet including one or more training signals that are to be transmitted in a direction that is different than a transmit beamforming direction used in a current micro-route that is used between the transmitting node and the receiving node, receiving feedback at the transmitting node indicating that a transmit/receive beamforming direction pair associated with an alternate micro-route provides a better communication link than a transmit/receive beamforming direction pair associated with the current micro-route, and changing the transmit beamforming direction used by the transmitting node to a transmit beamforming direction associated with the alternate micro-route.

An embodiment includes a node for use in a wireless communication network. The node includes a transceiver, a plurality of antennas, a beamformer that can beamform signals transmitted and received at the plurality of antennas, a processor, and a memory. For an embodiment, the memory is for storing program instructions that are executable by the processor to transmit and receive IP data packets between the node and a receiving node via a number of micro-routes that are defined in part by a transmit beamforming direction and a receive beamforming direction, transmit IP data packets including one or more training signals that are to be transmitted in a direction that is different than a transmit beamforming direction used in a current micro-route between the node and the receiving node, receive feedback from the receiving node indicating that a transmit/receive beamforming direction pair associated with an alternate micro-route provides a better communication link than a transmit/receive beamforming direction pair associated with a current micro-route, and change the transmit beamforming direction used by the node to a transmit beamforming direction associated with the alternate micro-route.

An embodiment includes a node for use in a wireless communication network. The nodes includes a transceiver, a plurality of antennas, a beamformer that can beamform signals transmitted and received at the plurality of antennas, a processor, and memory. For an embodiment, the memory is for storing program instructions that are executable by the processor to transmit and receive IP data packets between the node and a transmitting node via a number of micro-routes that are defined in part by a transmit beamforming direction and a receive beamforming direction, receive IP data packets including one or more training signals that are received in a direction that is different than a receive beamforming direction used in a current micro-route between the node and the transmitting node, transmit feedback to the transmitting node indicating that a transmit/receive beamforming direction pair associated with an alternate micro-route provides a better communication link than a transmit/receive beamforming direction pair associated with a current micro-rout, and change the receive beamforming direction used by the node to the receive beamforming direction associated with the alternate micro-route.

An embodiment includes a node for use in a wireless communication network. The node includes a transceiver, a plurality of antennas, a beamformer that can beamform signals transmitted and received at the plurality of antennas, a processor, and a memory. For an embodiment, the memory is for storing program instructions that are executable by the processor to transmit and receive IP data packets between the node and a receiving node via a number of micro-routes that are defined in part by a transmit beamforming direction and a receive beamforming direction, keep a record of a duration in which a particular transmit or receive direction is used to communicate with another node in the network, whereby the transmit or receive direction with the largest duration is selected as a back-up micro-route, and in the event that communication is lost with another node in the network, select the beamforming direction associated with the back-up micro-route to attempt to re-establish communications.

An embodiment includes a node for use in a wireless communication network. The node includes a transceiver, a plurality of antennas, a beamformer that can beamform signals transmitted and received at the plurality of antennas, a processor, and a memory. For an embodiment, the memory is for storing program instructions that are executable by the processor to transmit and receive IP data packets between the node and a receiving node via one or more of a number of micro-routes that are defined in part by a transmit beamforming direction and a receive beamforming direction, keep a record of a duration in which a particular transmit or receive direction is used to communicate with another node in the network, whereby the transmit or receive direction with the largest duration is selected as a back-up micro-route, and periodically select the beamforming direction associated with the back-up micro-route to determine if the back-up micro-route provides a better communication link than a current micro-route in use.

An embodiment includes a node for use in a wireless communication network. The node includes a transceiver, a plurality of antennas, a beamformer that can beamform signals transmitted and received at the plurality of antennas, a processor, and a memory. For an embodiment, the memory is for storing program instructions that are executable by the processor to transmit and receive IP data packets between the node and a receiving node via one or more of a number of micro-routes that are defined in part by a transmit beamforming direction and a receive beamforming direction, determine when communication with the receiving node in the wireless communication network has been lost, and attempt to reestablish communication with the receiving node using a previously determined micro-route.

Figure 6:
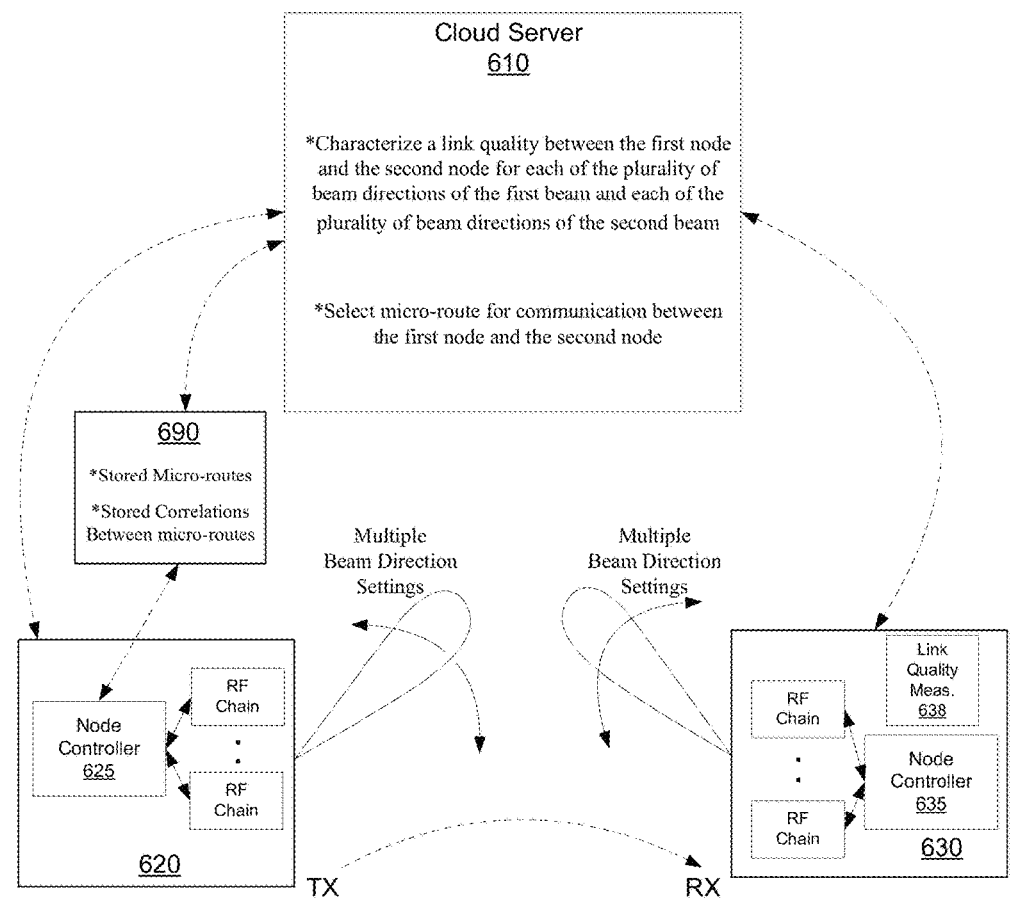
FIG. 6 is a block diagram of a transmitting node, a receiving node, and a central controller, according to an embodiment.

FIG. 6 shows a communication network that includes a transmitting node 620 and a receiving node 630 configured to transmit and receive packets between the transmitting node and the receiving node through one or more of a plurality of predetermined micro-routes. For an embodiment, each of the plurality of predetermined micro-routes is determined by a transmit beamforming direction and a receive beamforming direction. For at least some embodiments, the transmitting node 620 is configured to retrieve a first micro-route of the plurality of predetermined micro-routes (for example, the transmitting node can retrieve the first micro-route from storage (such as, storage 690) that includes the plurality of predetermined micro-routes). For at least some embodiments, the transmitting node 620 is configured to transmit packets in a first transmit beamforming direction associated with the first micro-route between the transmitting node and the receiving node, transmit packets including one or more training signals in a second transmit beamforming direction associated with a second micro-route of the plurality of predetermined micro-routes that is different than the first transmit beamforming direction associated with the first micro-route, and receive feedback from the receiving node 630 indicating that the second micro-route corresponding with a transmit/receive beamforming pair of the second transmit beamforming direction and a second receive beamforming direction provides a better communication link that a transmit/receive beamforming pair of the first transmit beamforming direction and a first receive beamforming direction of the first micro-route.

For at least some embodiments, the second micro-route is selected based upon a level of correlation between the first micro-route and the second micro-route. That is, the second micro-route is retrieved from storage of a plurality of available predetermined micro-routes between the transmitting node and the receiving node. The second micro-route is selected from the plurality of available micro-routes based on the level of correlation between the first micro-route and the second micro-route. That is, the second micro-route is selected rather than one of the other available predetermined micro-routes because of the level of correlation between the first micro-route and the second micro-route.

For an embodiment, the plurality of predetermined micro-routes are stored in memory 690, and include micro-routes between the transmitting node 620 and the receiving node 630 that have been previously determined through a micro-route characterization process. The micro-route characterization can be controlled by one or more of a node controller 625 of the transmitting node 620, a node controller 635 of the receiving node 630, and/or by a central or cloud controller 610. For an embodiment, the cloud controller 610 communicates with the transmitting node 620 and the receiving node 630, and provides at least some control over the operation of the transmitting node 620 and the receiving node 630. For at least some embodiments, the central or cloud controller 610 controls the transmitting node 620 and the receiving node 630 during the micro-route determination and/or characterization process. For an embodiment, link quality measurements between the transmitting node 620 and the receiving nodes 630 are measured at the receiving node through a link quality measurement 638. For at least some embodiment, link quality measurements are obtained at the receiving node for different micro-routes as controlled by the selections of the beam direction at both the transmitting node 620 and the receiving node 630. For an embodiment, the link quality measurements are used by the central or cloud controller 610 for determining and characterizing the micro-routes between the transmitting node 620 and the receiving node 630. Several embodiments for determining, characterizing and storing the micro-routes between the transmitting node and the receiving node will be described.

For at least some embodiments, once the transmitting node 620 receive feedback from the receiving node 630 indicating that the second micro-route corresponding with a transmit/receive beamforming pair of the second transmit beamforming direction and a second receive beamforming direction provides a better communication link that a transmit/receive beamforming pair of the first transmit beamforming direction and a first receive beamforming direction of the first micro-route, the transmitting node 620 changes a transmit beamforming direction of the transmitting node 620 to the second transmit beamforming direction associated with the second micro-route. Further, to support the second micro-route, the receiving node 630 changes to the second receive beamforming direction associated with the second micro-route.

For at least some embodiments, the transmission of packets that include one or more training signals is periodic. For at least some embodiment, the period of the periodic transmission of packets that include training signals is adaptively selected based upon one or more wireless network parameters. For at least some embodiments, the period of the periodic transmission is based on one or more of a link quality between the transmitting node and the receiving node, a detected change in a topology of the wireless communication network, a detected change in an environmental condition of the wireless communication network, a detected change in packet traffic of the wireless communication network, or a monitored condition of the wireless communication network At least some embodiments include the transmitting node adaptively transmitting packets that include one or more training signals in different transmit beamforming directions based on at least one of a link quality between the transmitting node and the receiving node, a detected change in a topology of the wireless communication network, a detected change in an environmental condition of the wireless communication network, a detected change in packet traffic of the wireless communication network, or a monitored condition of the wireless communication network.

For at least some embodiments, the transmission packets that include training signals is adaptively determined based on statistical analysis of the transmission channel between the transmitting node and the receiving node. For example, the link quality of the channel can be monitored over durations of time, such as, days, weeks months or years. At certain periods of time, channel behavior can be observed. For example, particular channel behavior may be observed during particular periods or times of the day, week, month or year. Based upon the statistical analysis of the channel over time, the transmission of packets that include training signal can be selected to correspond when the training signals or likely to be useful. For example, the statistical analysis may determine that the transmission channel between particular transmitting nodes and receiving nodes is compromised on particular times of the day, days of the week, weeks of the month, or months of the year. Accordingly, the statistical analysis can adaptively control the transmission of packets that include the training signals at the identified times in which the transmission channel is likely to be compromised. For at least some embodiments, the statistical analysis is performed at an upstream controller which at least partially controls when transmitting nodes transmit packets that include training signals.

For at least some embodiments, a (single) transmit packet includes a plurality of training signals. Further, for an embodiment, the transmitting node 620 transmits different training signals of the (single) packet with different transmit beamforming directions, and the receiving node receives the different training signals of the (single) packet with different receive beamforming directions. For an embodiment, the cloud controller 610 provides the transmitting node and the receiving node with control over the transmission of packets that include multiple training signals, and further, controls the transmit beamforming directions of the transmitting node 620 and the receive beamforming directions of the receiving node 630. For an embodiment, the control of the receive beamforming directions of the receiving node 630 is conveyed to the receiving node 630 by information included within the packet. That is, for example, a header of the packet is received by the receiving node 630 that include information that controls the receive beamforming directions of the receiving node 630.

For an embodiment, the transmitting node 620 is configured to retrieve two or more micro-routes of the plurality of predetermined micro-routes, transmit a first training signal of the plurality of training signals within the transmit packet in a first transmit beamforming direction associated with a first micro-route, transmit a second training signal of the plurality of training signals within the transmit packet in a second transmit beamforming direction associated with a second micro-route, and receive feedback from the receiving node indicating a communication link quality corresponding with one or more of a transmit/receive beamforming pair of the first transmit beamforming direction and a first receive beamforming direction, a transmit/receive beamforming pair of the first transmit beamforming direction and a second receive beamforming direction.

For at least some embodiments, the transmitting node is configured to receive feedback from the receiving node indicating a communication link quality corresponding with one or more of a transmit/receive beamforming pair of the second transmit beamforming direction and the first receive beamforming direction, a transmit/receive beamforming pair of the second transmit beamforming direction and the second receive beamforming direction.

As previously described, for an embodiment, the transmitting node is further configured to transmit a training packet a plurality of times in a single transmit beamforming direction, and receive feedback from the receiving node indicating detection of reception of the training packet in at least one of a plurality of receive beamforming directions. That is, the transmitting node repeatedly transmits the training packets in a single transmit beamforming direction, and the receiving node attempts to receive the training packet over a plurality of receive beamforming directions.

As previously described, for an embodiment, the transmitting node is further configured to transmit a training packet in a plurality transmit beamforming direction, and receive feedback from the receiving node indicating detection of reception of the training packet in a single receive beamforming direction for one or more of the plurality of transmit beamforming directions.

At least some embodiments include dithering (varying by a small (less than a selected threshold)) the transmit beamforming direction and/or the receive beamforming direction. That is, for an embodiment, after a preselected micro-route has been selected, and the transmit beamforming direction of the transmitting node 620 and the receive beamforming direction of the receiving node 630 have been set according to the selected micro-route, either the transmit beamforming direction or the receive beamforming direction are adjusted (fine-tune adjusted) about the selected beamforming direction. The direction of either the transmit beamforming direction or the receive beamforming direction are slightly adjusted about the AoD (angle of departure) of the transmit beamforming direction or about the AoA (angle of arrival) the receive beamforming direction. For an embodiment, different training signals are transmitted while direction of the transmit beamforming direction or the receive beamforming direction is adjusted.

For an embodiment, the transmitting node 620 is configured to transmit a first training signal of the plurality of training signals within the at least one transmit packet in a first fined-tuned direction of a transmit beamforming direction associated with a micro-route, wherein the first fine-tune direction deviates a direction of the transmit beamforming direction by a first threshold. For an embodiment, the first threshold is a deviation in the AoD of the transmit beamforming direction of less than a preselected amount. Further, the transmitting node 620 is configured to transmit a second training signal of the plurality of training signals within the at least one transmit packet in a second fine-tuned direction of the transmit beamforming direction associated with the micro-route, wherein the second fine-tune direction deviates a direction of the transmit beamforming direction by a second threshold. For an embodiment, the second threshold is a deviation in the AoD of the transmit beamforming direction of less than the preselected amount. Further, the transmitting node 620 is configured to receive feedback from the receiving node indicating a communication link quality corresponding with one or more of first fine-tuned direction of the transmit beamforming direction or the second fine-tuned direction of the transmit beamforming direction. For an embodiment, the first and second threshold are selected to be greater than a minimal threshold (that is, at least some deviation of the beam directions occurs) but less than half the deviation (difference between the AoD or AoA) between transmit beamforming direction and/or receive beamforming directions of two different preselected micro-routes.

For at least some embodiments, at least one of an upstream controller or a controller of the transmitting node is operative to determine the plurality of predetermined micro-routes. For an embodiment, determining the plurality of predetermined micro-routes includes characterizing a plurality of micro-routes between the transmitting node and the receiving node, and storing the characterized plurality of micro-routes. For at least some embodiments, characterizing the plurality of micro-routes between the transmitting node and the receiving node includes the upstream controller being operative to direct a first beam formed by a plurality of antennas of the transmitting node to a plurality of directions, direct a second beam formed by a plurality of antennas of the receiving nodes to a plurality of directions for each of the plurality of directions of the first beam, and characterize a link quality between the transmitting node and the receiving node for each of the plurality of beam directions of the first beam and each of the plurality of beam directions of the second beam. Various embodiments for determining and characterizing the micro-routes between the transmitting node and the receiving node are depicted in FIGS. 8A, 8B, 9A, 9B, 10-20.

For at least some embodiments, the receiving node decodes a header of a packet received from the transmitting node, and determines a number of training signals included within the packet, and a number of receive beamforming directions of the receiving node for the number of training signals. For an embodiment, a node controller of the transmitting node determines the number of training signals included within the packet, and the number of receive beamforming directions of the receiving node for the number of training signals. For an embodiment, the cloud controller determines the number of training signals included within the packet, and the number of receive beamforming directions of the receiving node for the number of training signals.

For an embodiment, the number of predetermined routes is scaled or adaptively adjusted. That is, a full scan includes selected from among all preselected micro-routes, whereas a shortened scan includes selection of micro-routes from a scaled-down set of the preselected micro-routes. As will be described, for at least some embodiments, during the characterization process, characterized micro-routes are clustered, and a level of correlation between the clustered micro-routes is determined. For an embodiment, the shortened scan, or scaling of the predetermined micro-routes that are selected from, includes scaling the predetermined micro-routes depending upon the link quality associated with the micro-routes, and the level of correlation between the micro-routes. More specifically, for an embodiment, the least correlated micro-routes and the micro-routes having the best link quality are selected.

Figure 7:
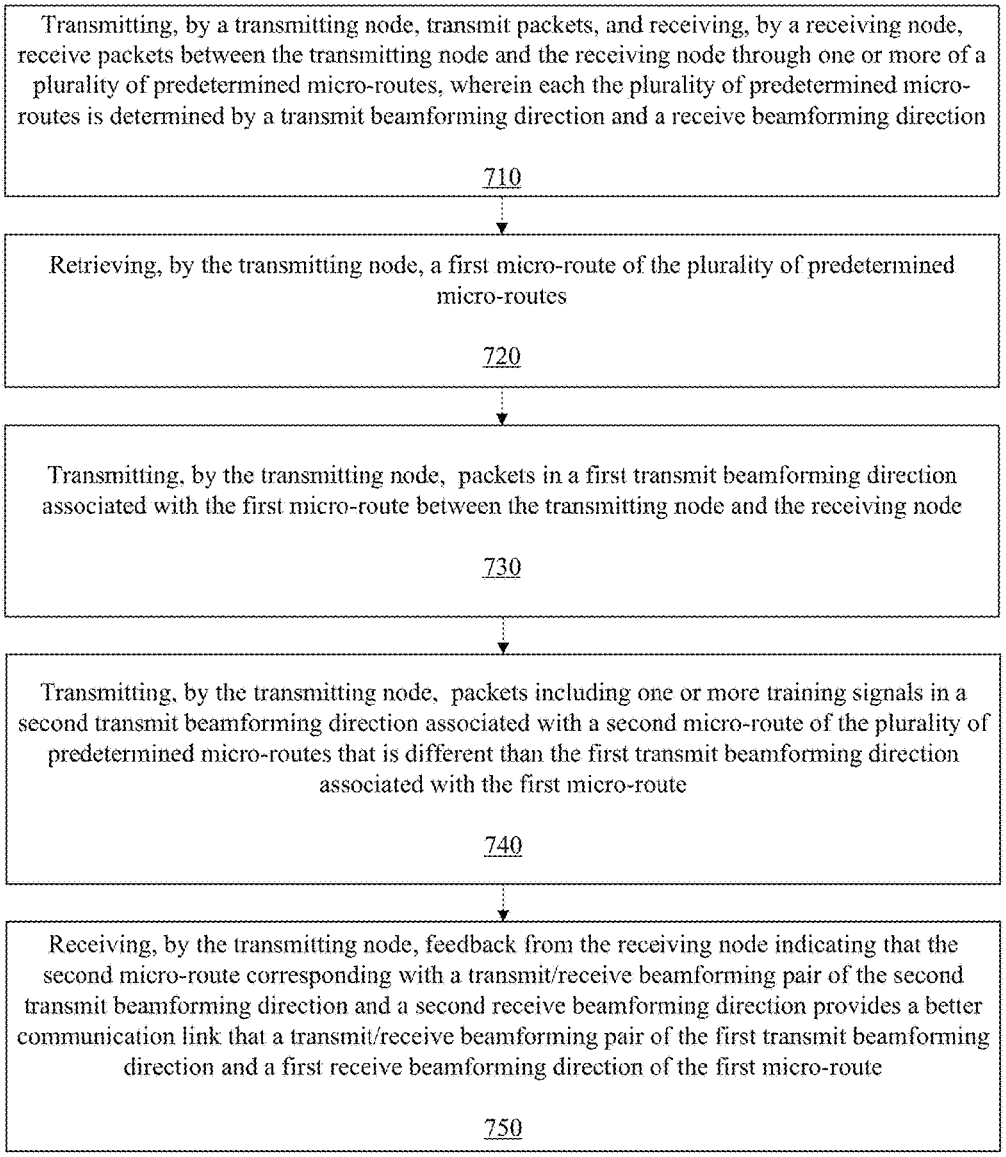
FIG. 7 is a flow chart that includes acts of a method, according to an embodiment.

FIG. 7 is a flow chart that includes acts of a method, according to an embodiment. A first step 710 includes transmitting, by a transmitting node, transmit packets, and receiving, by a receiving node, receive packets between the transmitting node and the receiving node through one or more of a plurality of predetermined micro-routes, wherein each the plurality of predetermined micro-routes is determined by a transmit beamforming direction and a receive beamforming direction. A second step 720 includes retrieving, by the transmitting node, a first micro-route of the plurality of predetermined micro-routes. A third step 730 includes transmitting, by the transmitting node, packets in a first transmit beamforming direction associated with the first micro-route between the transmitting node and the receiving node. A fourth step 740 includes transmitting, by the transmitting node, packets including one or more training signals in a second transmit beamforming direction associated with a second micro-route of the plurality of predetermined micro-routes that is different than the first transmit beamforming direction associated with the first micro-route. A fifth step 750 includes receiving, by the transmitting node, feedback from the receiving node indicating that the second micro-route corresponding with a transmit/receive beamforming pair of the second transmit beamforming direction and a second receive beamforming direction provides a better communication link that a transmit/receive beamforming pair of the first transmit beamforming direction and a first receive beamforming direction of the first micro-route. An embodiment include changing, by the transmitting node, a transmit beamforming direction of the transmitting node to the second transmit beamforming direction associated with the second micro-route.

At least some embodiments further include adaptively transmitting packets, by the transmitting node, that include one or more training signals in different transmit beamforming directions based on at least one of a link quality between the transmitting node and the receiving node, a detected change in a topology of the wireless communication network, a detected change in an environmental condition of the wireless communication network, a detected change in packet traffic of the wireless communication network, or a monitored condition of the wireless communication network.

For at least some embodiments, a transmit packet includes a plurality of training signals. Further, the method further includes retrieving, by the transmitting node, two or more micro-routes of the plurality of predetermined micro-routes, transmitting, by the transmitting node, a first training signal of the plurality of training signals within the transmit packet in a first transmit beamforming direction associated with a first micro-route, transmitting, by the transmitting node, a second training signal of the plurality of training signals within the transmit packet in a second transmit beamforming direction associated with a second micro-route, and receiving, by the transmitting node, feedback from the receiving node indicating a communication link quality corresponding with one or more of a transmit/receive beamforming pair of the first transmit beamforming direction and a first receive beamforming direction, a transmit/receive beamforming pair of the first transmit beamforming direction and a second receive beamforming direction.

At least some embodiments further include receiving, by the transmitting node, feedback from the receiving node indicating a communication link quality corresponding with one or more of a transmit/receive beamforming pair of the second transmit beamforming direction and the first receive beamforming direction, a transmit/receive beamforming pair of the second transmit beamforming direction and the second receive beamforming direction.

As previously described, at least some embodiments further include transmitting, by the transmitting node, a first training signal of the plurality of training signals within the at least one transmit packet in a first fined-tuned direction of a transmit beamforming direction associated with a micro-route, wherein the first fine-tune direction deviates a direction of the transmit beamforming direction by a first threshold, transmitting, by the transmitting node, a second training signal of the plurality of training signals within the at least one transmit packet in a second fine-tuned direction of the transmit beamforming direction associated with the micro-route, wherein the second fine-tune direction deviates a direction of the transmit beamforming direction by a second threshold, and receiving, by the transmitting node, feedback from the receiving node indicating a communication link quality corresponding with one or more of first fine-tuned direction of the transmit beamforming direction or the second fine-tuned direction of the transmit beamforming direction.

As previously described, at least some embodiments include determining the plurality of predetermined micro-routes including characterizing a plurality of micro-routes between the transmitting node and the receiving node, and storing the characterized plurality of micro-routes. For at least some embodiments, characterizing the plurality of micro-routes between the transmitting node and the receiving node includes directing a first beam formed by a plurality of antennas of the transmitting node to a plurality of directions, for each of the plurality of directions of the first beam, directing a second beam formed by a plurality of antennas of the receiving nodes to a plurality of directions, and characterizing a link quality between the transmitting node and the receiving node for each of the plurality of beam directions of the first beam and each of the plurality of beam directions of the second beam.

As previously described, at least some embodiments the receiving node decodes a header of a packet received from the transmitting node, and determines a number of training signals included within the packet, and a number of receive beamforming directions of the receiving node for the number of training signals.

As described, at least some embodiments include retrieving a first micro-route from the plurality of predetermined micro-routes, and retrieving a second micro-route from the plurality of predetermined micro-routes. For an embodiment, retrieving the micro-routes include accessing the micro-routes from storage that includes the plurality of predetermined micro-routes. For at least some embodiments, the plurality of predetermined micro-routes is determined by a characterization procedure in which micro-routes between the transmitting (first) node and the receiving (second) node are determined and characterized.

For an embodiment, once characterized, one or more of the characterized micro-routes is selected for wireless communication between the first (transmitting) node and the second (receiving) node. For an embodiment, upon detecting a condition (for an embodiment, the condition indicates performance of the micro-route of below a threshold) of a micro-route that is being used to wirelessly communicated between nodes of the wireless network, a different micro-route is selected based on a level of correlation between the micro-route and the different micro-route.

Micro-Routes

Micro-routes are transmission paths that are formed between wireless nodes of a wireless network. Due to real-world conditions, direct and reflective transmission paths (micro-routes) can be formed between the wireless nodes. The micro-routes can change over time, wherein some micro-routes disappear and other are formed as conditions and the environment between the wireless nodes changes. Generally, some micro-routes are correlated (that is, the micro-routes are similar in that the same effects (such as, interference) influence the performance of wireless communication through the micro-routes), and some micro-routes are not correlated (that is, correlated less than a threshold). For an embodiment, when a micro-route is being used for wireless communication, and that micro-route suffers from a performance degrading effect, a different (new) micro-route is selected to replace the micro-route, wherein the selection of the different micro-route is made based on the level of correlation of the micro-route to the difference micro-route. The less correlated the different micro-route is to the previously selected or used micro-route, the less likely the different route is to be suffering from the same performance degrading effects.

Micro-Route Analytics

Micro-route analytics deals with the processing of micro-routes. For an embodiment, the processing of micro-routes includes the identification of the micro-routes, and characterization of the identified micro-routes. For an embodiment, the micro-route analytics is performed at an upstream server that is connected to the wireless nodes, such as, at a cloud controller. For an embodiment, the micro-route analytics is performed at a link level, for example, at one or more of the wireless nodes. For an embodiment, the micro-route analytics is jointly performed through the interaction between the cloud controller and a local LA (link analytics) module at the transmit portion of the link. At least some of the described embodiments include processing for selecting, ordering and weeding out micro-routes to be used at the link level.

Micro-Route Correlation Detection

Micro-route correlation detection refers to the mapping of beamforming vector combinations to the actual physical paths of the link. By a definition, a micro-route is synonymous with one of available propagation paths of the channel. A micro-route can correspond to a physical path, which can be either a line of sight path or a reflection of order one or more. Also, due to the geometry and the type of environment, two unique paths (micro-routes) in the link can be correlated. For an embodiment, an analytics module residing in the cloud or one or more of the wireless nodes identifies the level of correlation between micro-routes of a link between the wireless nodes. For an embodiment, correlation between identified micro-routes is determined by testing different micro-routes over time, and determining similarities of the performance, and variations of the performance of the different micro-routes. The less the similarities between the different micro-routes, the less the correlation between different micro-routes.

For at least some embodiments, the micro-routes between the transmitting node and the receiving node are monitored over time. That is, the performance of the micro-routes is re-characterized repeatedly over time. For at least some embodiments, the level of correlation between the different micro-routes is determined by determining variations in the performance (for example, measured link quality) between the different micro-routes over the repeated characterizations. That is, the correlation determination includes determining whether the performance of the different micro-routes changes similarly or differently over time. The more correlated different micro-routes are, the more similar the variations in the performance of the micro-routes. The less correlated the different micro-routes are, the less similar the variation in the performance of the micro-routes. Statistical processes can be used to determine the similarity or difference between different micro-routes over time by comparing the performance of the different micro-route over the repeated characterization of the performance of the different micro-routes over time.

For at least some embodiments, the correlation between different micro-routes is determined by determining how the performance of the different micro-routes is affected by a change in a network condition. Exemplary network conditions include the introduction or the elimination of one or more interfering signals, a change in network topology (such as, the addition or removal of a network node, or the change of location of a network node), a change in the environment around or surrounding the wireless network (such as, movement of, addition of, or subtraction of a physical object). If the different micro-routes are correlated, then the change in the network condition will change the performance of the different micro-routes similarly. If the different micro-routes are not correlated, then the change in the network condition will change the performance of the different micro-routes differently. Statistical processes can be used to determine the similarity or difference between different micro-routes with changes in the network conditions.

Identifying Micro-Routes

Figure 8A:
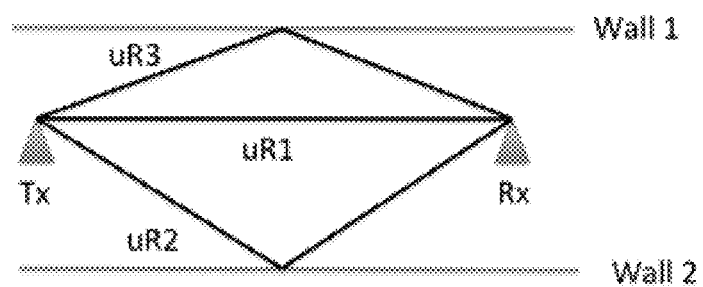
FIG. 8A shows a transmitter and a receiver of a wireless network, wherein micro-routes are formed between the first node and the second node, according to an embodiment.

FIG. 8A shows a transmitter and a receiver of a wireless network, wherein micro-routes are formed between the first node (Tx) and the second node (Rx), according to an embodiment. As shown, three physical paths (uR1, uR2, uR3) exist between the transmitter (Tx) and the receiver (Rx). Each of the three physical paths (micro-routes) includes an angle of departure (AoD) from the transmitter (Tx) and angle of arrival (AoA) to the receiver (Rx).

For at least some embodiments, each of the transmitter (Tx) and the receiver (Rx) include a plurality of antennas, and are operable to form directional beams. The right combinations of transmit antenna beam and receiver antenna beam directions excites one of the micro-routes if, for example, a main lobe of a beam formed by the plurality of antennas of the transmitter (Tx) is directed in the vicinity of the AoD of the excited micro-route and a main lobe of a beam formed by the plurality of antennas of the receiver (Rx) is directed in the vicinity of the AoA of the excited micro-route.

For an embodiment, at the link layer (at the nodes), a beamforming acquisition procedure identifies all the beam combinations that can establish the link between the transmitting node and the receiving node. For an embodiment, at the system level (for example, controlled by a cloud server that is connected through a network to the transmitting node and the receiving node) the beamforming acquisition procedure identifies all the beam combinations that can establish the link between the transmitting node and the receiving node.

Figure 8B:
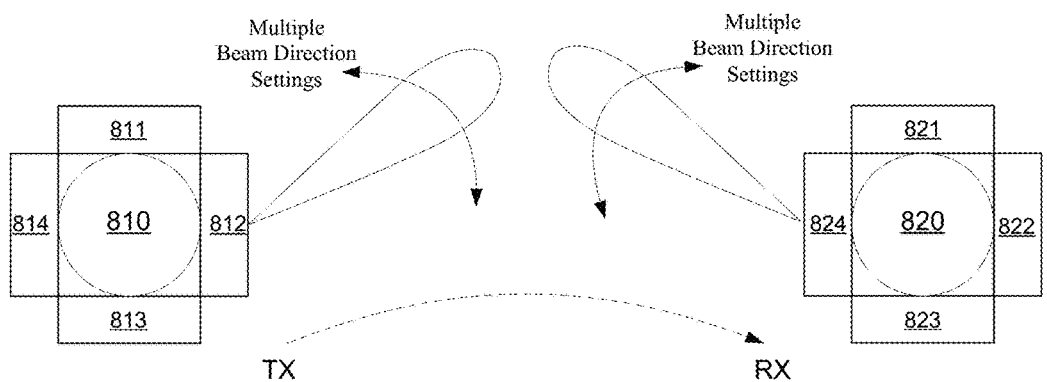
FIG. 8B shows a first node and a second node of a wireless network, wherein micro-routes between the first node and the second node are characterized, according to an embodiment.

FIG. 8B shows a first node 810 and a second node 820 of a wireless network, wherein micro-routes between the first node 810 and the second node 820 are characterized, according to an embodiment. For an embodiment, the first node 810 (transmitting node) includes multiple antennas and transmits a beam-formed signal. A direction of the beam-formed signal of the first node 810 is adjusted to multiple direction settings. That is, the AoD of the beam-formed signal of the first node 810 is different for each of the multiple direction settings. For an embodiment, the multiple direction setting includes sweeping the AoD of the first node 110 over multiple angles (multiple AoDs).

For at least some embodiments, the first node 810 and the second node 820 include multiple sectors 811, 812, 813, 814, 821, 822, 823, 824. For at least some embodiments, each sector includes a radio. Further, for an embodiment, each sector includes multiple antennas that are operative to form beams.

For an embodiment, for each multiple beam direction settings of the beam-formed signal of the first node 810, a beam-formed direction of the second node (receiving node) 820 is adjusted to multiple direction settings. For each setting of the beam-formed signal of the first node 810 and beam-formed direction of the second node 820, a link quality characterization between the first node 810 and the second node 820 is made. For an embodiment, the transmitting node 810 transmits an equivalent signal at each of the beam-formed directions of the first (transmitting) node 810. The receiving node 820 then measures a received signal level at each of the beam-formed directions of the second (receiving) node.

For an embodiment, a matrix is generated based on the beam-formed directions of the transmitting node and the beam-formed direction of the receiving node. This matrix can be a two dimensional matrix and a three dimensional matrix. For an embodiment, the number of elements of the matrix is dependent upon the number of beam-formed directions of the transmitting node and the number of beam-formed directions of the receiving node.

Channel and System Model Between Wireless Nodes

For an embodiment, an analog N×N multipath channel H between the two N-element antenna arrays (that is, two node (transmitting node and receiving node) having N antenna elements) is given by:

$$H(\tau) = \sum_{l=1}^{L} \alpha(l) v(\theta_R(l)) v^H(\theta_T(l)) \delta(\tau - \tau(l))$$

where, l Is the path index, $\alpha(l)$ is the complex coefficient of the path which captures the relative magnitude and phase of path l, $\theta_R(l)$ is the DFT (Discrete Fourier Transform) angle corresponding to the angle of arrival of path l at the receive array, $\theta_T(l)$ is the DFT angle corresponding to the angle of departure of path l at the receive array, $\tau(l)$ is the relative time delay of path l, and $v(\theta)$ is a DFT vector with the nth entry being $\exp(jn\theta)$.

For an embodiment, mapping to a DFT angle (angular frequency) and the physical direction is related to the array parameters and is expressed as $$\theta = \frac{2\pi d}{\lambda} \cos A_p$$

where $A_p$ is the physical direction of arrival/departure in reference to the orientation of the array.

For a given combination of beam formers, $\{w_T, w_R\}$ at tx and rx, The input-output relationship for the link can be written as $$y(t) = x(t) * \{w_R^H H(t) w_T\} + n(t)$$

Now considering geometric beamforming at both Tx and Rx. The geometric beamforming satisfies the DFT structure as well. For tx beamforming at angular frequency $\phi_T$ and rx beamforming at angular frequency $\phi_R$, the effective signal component is given by $$v^H(\phi_R) H(\tau) v(\phi_T) =$$

$$\sum_{l=1}^{L} \alpha(l) \{v^H(\phi_R) v(\theta_R(l))\} \{v^H(\theta_T(l)) v(\phi_T)\} \delta(\tau - \tau(l)) = \sum_{l=1}^{L} \alpha(l)$$

$$\exp\left(\frac{(N-1)(\Delta_T(l) + \Delta_R(l))}{2}\right) \operatorname{sinc}(N\Delta_T(l)) \operatorname{sinc}(N\Delta_R(l)) \delta(\tau - \tau(l))$$

when $$\Delta_T(l) = \phi_T - \theta_T(l) \Delta_R(l) = \theta_R(l) - \phi_R \operatorname{sinc}(N\Delta) = \frac{\sin(N\Delta/2)}{\sin(\Delta/2)}$$

It is to be noted that the above analysis does not take into account any differential response due to change in the elevation angle of different paths (example: ground bounce). This means either the antenna response is flat across the elevation angle, or paths have the same elevation angle.

For an embodiment of an antenna array, which doesn't steer across elevation dimension, by capturing the effect of elevation in the complex coefficient of the path $\alpha(l)$, the effect of elevation can be appropriately modeled as follows:

$$H(\tau) = \sum_{l=1}^{L} \alpha(l, \psi_T(l), \psi_R(l)) v(\theta_R(l)) v^H(\theta_T(l)) \delta(\tau - \tau(l))$$

Even for ground bounce where azimuth beamforming is optimal, the elevation response is attenuated to a considerable extent in addition to the attenuation caused by the reflection. For example, in one of the worst cases of ground bounce effect where the antenna height is only 5 m and distance 200 m, the elevation angle will be approximately 3 degrees. With antenna array of elevation HPBW of about 10 degrees, the antenna pattern at both ends jointly can suppress the ground bounce by at least 3 dB. Also, the ground reflection is expected to be at least 2 dB resulting in a minimum suppression of at least 5 dB.

For an established beam combination, it can be seen that only one micro-route will be predominantly excited. Here the effective channel is approximated as $$h(\tau) \approx$$

$$\alpha(l^*) \exp\left(\frac{(N-1)(\Delta_T(l^*) + \Delta_R(l^*))}{2}\right) \operatorname{sinc}(N\Delta_T(l^*)) \operatorname{sinc}(N\Delta_R(l^*)) \delta(\tau - \tau(l^*))$$

where l* represents the index of the significant physical path that was excited by the beamformer.

Figure 9A:
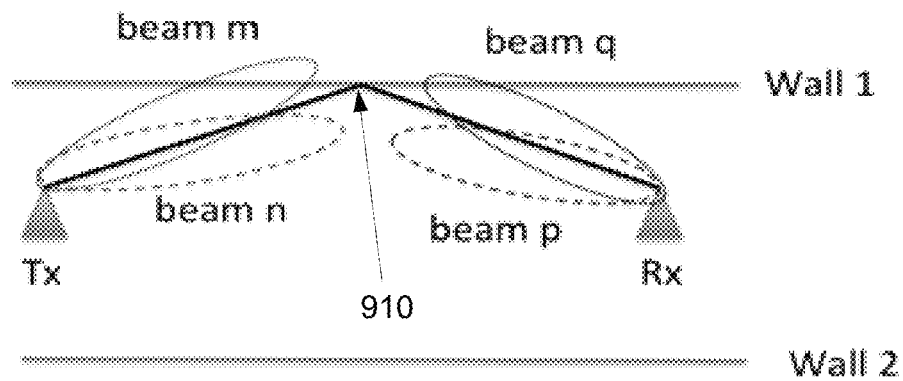
FIG. 9A shows a transmitter and a receiver of a wireless network, wherein a single micro-route can be formed between the first node and the second node for multiple beam directions, according to an embodiment.

FIG. 9A shows a transmitter (Tx) and a receiver (Rx) of a wireless network, wherein a single micro-route 910 can be formed between the first node (TX) and the second node (RX) for multiple beam directions, according to an embodiment. That is, for example, FIG. 9A shows two different beam directions (m, n) of the TX and two different beam directions (q, p) of the RX. It is possible that different of these combinations of directions excite the same micro-route 910. An embodiment includes clustering the measured responses of multiple beam directions which correspond with a single micro-route. That is, multiple beam directions of the transmitting node and multiple beam directions of the receiving node can excited the same micro-route. At least some embodiments include clustering the measured responses of the multiple beam directions into a single identified micro-route.

Figure 9B:
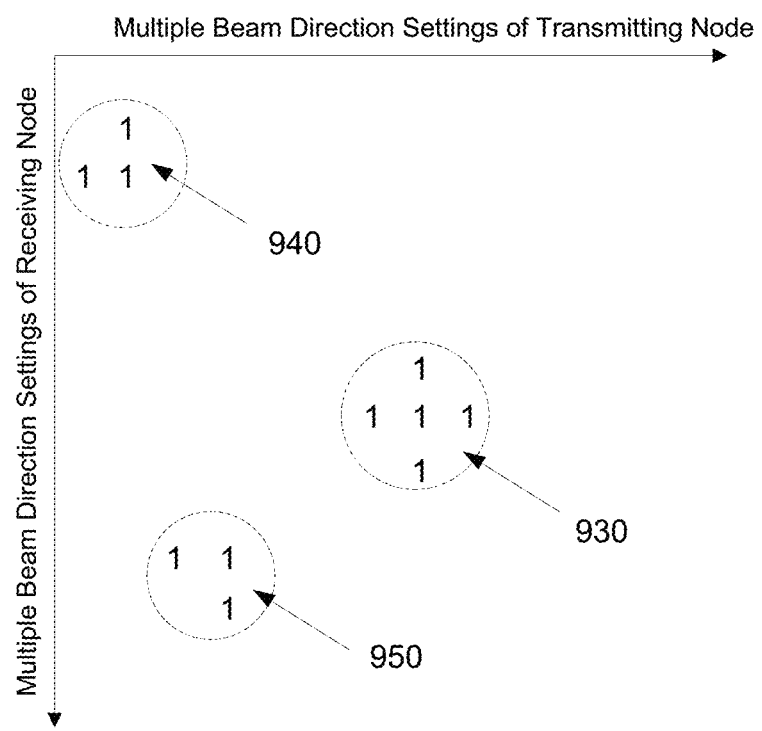
FIG. 9B shows micro-routes being identified by clustering measured link qualities for multiple beam directions, according to an embodiment.

FIG. 9B shows micro-routes being identified by clustering measured link qualities for multiple beam directions, according to an embodiment. The number "1"s depicted in FIG. 9B represent link quality measurements greater than a threshold. If a measurement is less than the threshold, a "1" is not indicated. A first cluster 930 includes multiple link quality measurements for a first set of transmit beam directions and receive beam directions. The measurements within the clusters are related as having link qualities greater than a link quality threshold, and as having very similar (within a threshold) beam setting directions.

A second cluster 940 includes multiple link quality measurements for a second set of transmit beam directions and receive beam directions. A third cluster 950 includes multiple link quality measurements for a second set of transmit beam directions and receive beam directions.

For at least some embodiments, clustering multiple link quality measurements includes generating a link quality matrix based on link quality measurements between a transmitting node and a receiving node for multiple transmit beam directions (multiple AoDs) and for multiple receive beam directions (multiple AoAs). Further, the clustering includes identifying link quality measurements having a quality better than a quality threshold. Further, link quality measurements of greater than the threshold and within an AoD range threshold and within an AoA range threshold are clustered, and each cluster is identified as a single micro-link. That is, as shown in FIG. 9A, a single micro-route may be formed between the transmitting node (Tx) and the receiving node (Rx) for a small (threshold) range of variations of the AoD and a small (threshold) range of variations of the AoA. For an embodiment, the measured link qualities for small (less than a threshold) of variations of AoD and AoA having a link quality better than the quality threshold are clustered, and designated as a single micro-route. Once clustered, the described embodiments further include classifying the different identified clusters (micro-routes) as side-lobes of a micro-route or as separate micro-routes.

Classifying Clusters

For an embodiment, a cluster includes just a single link quality measurement of a single transmitter AoD and a single receiver AoA. For an embodiment, a cluster includes multiple link quality measurements of multiple transmitter AoD(s) and multiple receiver AoA(s).

At least some embodiments include processing based on deterministic aspects of the link geometry. At least some embodiments include one or more of the following assumptions. A first assumption includes assuming a link budget is such that only main-lobe of the array pattern (at least on one side) can establish the link. A second assumption includes assuming that at most, only one physical propagation path can be excited with any beam combination. For some embodiments with ground bounce, there can be two paths, but the ground bounce path is at least 5 dB lower. For at least some embodiments, ground bounce is still considered separately in the analysis. A second assumption includes assuming with a CPHY, a minimum SNR of −8 dB is required to establish the link. Assuming 10 dB requirement for MCS 8 (modulation and coding scheme 8), there is a margin of 18 dB to establish the link.

Assume that a beam combination $(\phi_{T1}, \phi_{R1})$ excites a particular Azimuth path $$l^* h(\tau) \approx \alpha(l^*) \exp\left(\frac{(N-1)(\phi_{T1} - \theta_T(l^*) + \theta_R(l^*) - \phi_{R1})}{2}\right)$$
$$\operatorname{sinc}(N\Delta_T(l^*))\operatorname{sinc}(N\Delta_R(l^*))\delta(\tau - \tau(l^*))$$

The magnitude and phase terms are:

$$G(\phi_{T1}, \phi_{R1}) = |\alpha(l^*)|\operatorname{sinc}(N(\phi_{T1} - \theta_T(l^*)))\operatorname{sinc}(N(\theta_R(l^*) - \phi_{R1}))$$

$$P(\phi_{T1}, \phi_{R1}) = \angle\alpha(l^*) + \frac{(N-1)(\phi_{T1} - \theta_T(l^*) + \theta_R(l^*) - \phi_{R1})}{2}$$

With a different beam combination $(\phi_{T2}, \phi_{R2})$.

$$G(\phi_{T2}, \phi_{R2}) = |\alpha(l^*)|\operatorname{sinc}(N(\phi_{T2} - \theta_T(l^*)))\operatorname{sinc}(N(\theta_R(l^*) - \phi_{R2}))P(\phi_{T2}, \phi_{R2})$$
$$= \angle\alpha(l^*) + \frac{(N-1)(\phi_{T2} - \theta_T(l^*) + \theta_R(l^*) - \phi_{R2})}{2}$$

The relative gain change is:

$$\frac{G(\phi_{T1}, \phi_{R1})}{G(\phi_{T2}, \phi_{R2})} = \frac{\operatorname{sinc}(N(\phi_{T1} - \theta_T(l^*)))\operatorname{sinc}(N(\theta_R(l^*) - \phi_{R1}))}{\operatorname{sinc}(N(\phi_{T2} - \theta_T(l^*)))\operatorname{sinc}(N(\theta_R(l^*) - \phi_{R2}))}$$

and the relative phase change is:

$$P(\phi_{T1}, \phi_{R1}) - P(\phi_{T2}, \phi_{R2}) = \frac{(N-1)(\phi_{T1} - \phi_{T2} + \phi_{R2} - \phi_{R1})}{2}$$

Assuming that the second beam-combination $(\phi_{T2}, \phi_{R2})$ is refined for the micro-route $l^*$ which is equivalent to $\phi_{T2} \approx \theta_T(l^*)$ and $\phi_{R2} \approx \theta_R(l^*)$, then:

$$\frac{G(\phi_{T1}, \phi_{R1})}{G(\phi_{T2}, \phi_{R2})} \approx \operatorname{sinc}(N(\phi_{T1} - \phi_{T2}))\operatorname{sinc}(N(\phi_{R2} - \phi_{R1}))$$

Now consider the effect of ground bounce. Since the Azimuth beam pattern is common for both LOS and ground bounce paths, then:

$$h(\tau) \approx \left(\exp\left(\frac{(N-1)(\Delta_T + \Delta_R)}{2}\right)\operatorname{sinc}(N\Delta_T)\operatorname{sinc}(N\Delta_R)\right)$$
$$(\alpha^{LOS}\delta(\tau - \tau^{LOS}) + \alpha^{GB}\delta(\tau - \tau^{GB}))$$

where $\alpha^{LOS}$ and $\tau^{LOS}$ are the complex coefficient and relative path delay for the LOS path respectively, $\alpha^{GB}$ and $\tau^{GB}$ are the complex coefficient and relative path delay for the ground bounce respectively.

It can be seen from the above that the above channel response can be considered to have two components; one based on the beamforming relative to the AoA and AoD while the other is purely based on the physical propagation path. It can be verified that the relative gain change and the phase change is the same regardless of the presence or absence of the ground bounce. Based on the analysis above, at least some embodiments include the following methods for mapping the beamformers into the clusters.

Clustering Based on Array Beam-Width (Passive Method)

It can be observed in FIG. 9A that the antenna pattern response is reduced by 5 dB in less than 2.5 degrees from the peak (5 dB beam-width=5 deg). As a result, two working beam combinations $(\phi_{T1}, \phi_{R1})$ and $(\phi_{T2}, \phi_{R2})$ are independent (different clusters) if:

$$|f(\phi_{T1}) - f(\phi_{T2})| > \frac{5\pi}{180} \text{ and } |f(\phi_{R1}) - f(\phi_{R2})| > \frac{5\pi}{180}$$

where $f(x)$ maps the DFT angular frequency into physical angle of arrival/departure.

$$f(x) = \cos^{-1}\left(\frac{\lambda x}{2\pi d}\right)$$

This method is passive as it doesn't require any OTA (over the air) communication to determine correlation.

Clustering Based on Mismatched Combination (Active Method)

This is an active method wherein OTA communication is required to detect correlation. Two combinations are correlated if this is true:

$$\Gamma(\phi_{T1}, \phi_{R2}) = 1 \text{ and } \Gamma(\phi_{T2}, \phi_{R1}) = 1,$$

where $\Gamma(.)$ is an indicator function for the success of the beam combination in establishing the link.

Also, the following is a good measure of correlation:

$$G(\phi_{T2}, \phi_{R2}) \leq \max(G(\phi_{T2}, \phi_{R1}), G(\phi_{T1}, \phi_{R2}))$$

Based on Relative Gain and Phase Change (Active Method)

This method can use BRP (beam refinement protocol) fields for efficient testing of the hypothesis OTA. Using BRP fields, the following metrics are calculated:

Based on the analysis in this section, the relative gain change should be such that:

$$\min\left(\frac{G(\phi_{T1}, \phi_{R1})}{G(\phi_{T2}, \phi_{R2})}, \frac{G(\phi_{T2}, \phi_{R2})}{G(\phi_{T1}, \phi_{R1})}\right) \approx \mathrm{sinc}(N(\phi_{T1} - \phi_{T2}))\mathrm{sinc}(N(\phi_{R2} - \phi_{R1}))$$

and the relative phase change should be:

$$P(\phi_{T1}, \phi_{R1}) - P(\phi_{T2}, \phi_{R2}) = \frac{(N-1)(\phi_{T1} - \phi_{T2} + \phi_{R2} - \phi_{R1})}{2}.$$

In general, the above-calculations can also be computed without using BRP, but rather, using channel estimation and path delay estimation.

Otherwise the beam-combination is not correlated.

At least some embodiments include a packet structure such that training fields of the packets are employed to check for correlation of beams.

FIG. 10 shows a table of measured qualities of micro-routes, according to an embodiment. The table includes the measured value of the link quality between the transmitting node (either the first node or the second node) and the receiving node (either the first node or the second node). For an embodiment, the columns (1-12) of the table represent different beam directions (AoD) of the first (transmitting) node. For an embodiment, the rows (1-12) of the table represent different beam directions (AoA) of the second (receiving) node.

As stated above, for an embodiment, a link quality characterization is made at each of the beam forming directions of the transmitting and the receiving nodes. For the table of FIG. 10, the value of "X" indicates the link quality is below a predetermined threshold. That is, the link quality at these settings of the beam directions of the first and second nodes is below a threshold.

For an embodiment, one or more of the "V" s depicted in FIG. 3 represent a cluster of measurements as shown in FIG. 9B. That is, the "V" may represent multiple measurements that have been clustered into a single representation. That is, each of the beam settings depicted in FIG. 3 may include finer resolution settings that have been clustered into the single representation.

A first link quality measurement is depicted as "V1" which correspond to a beam direction setting of the first node of 6, and a beam direction setting of the second node of 6. If the value of V1 is greater than all the other measured values of the link quality, then these settings correspond with the highest quality micro-route between the first node and the second node. For an embodiment, this micro-route may be selected for communication between the first node and the second node. However, at least some embodiments include identifying other micro-routes that may be used if the originally selected micro-route fails.

As shown by the table of FIG. 10, other values V2 (which corresponds with the beam direction setting of 4 of the first node and the beam direction setting of 6 of the second node), V3 (which corresponds with the beam direction setting of 8 of the first node and the beam direction setting of 6 of the second node), V4 (which corresponds with the beam direction setting of 6 of the first node and the beam direction setting of 4 of the second node), V5 (which corresponds with the beam direction setting of 6 of the first node and the beam direction setting of 8 of the second node), V6 (which corresponds with the beam direction setting of 1 of the first node and the beam direction setting of 4 of the second node), V7 (which corresponds with the beam direction setting of 2 of the first node and the beam direction setting of 2 of the second node), V8 (which corresponds with the beam direction setting of 4 of the first node and the beam direction setting of 2 of the second node), V9 (which corresponds with the beam direction setting of 6 of the first node and the beam direction setting of 2 of the second node), V10 (which corresponds with the beam direction setting of 10 of the first node and the beam direction setting of 11 of the second node), V11 (which corresponds with the beam direction setting of 3 of the first node and the beam direction setting of 11 of the second node), V12 (which corresponds with the beam direction setting of 3 of the first node and the beam direction setting of 10 of the second node), V13 (which corresponds with the beam direction setting of 4 of the first node and the beam direction setting of 11 of the second node), are also depicted. Anyone of these other measured values of link quality may be different micro-route than the micro-route corresponding with the measure link quality of V1.

Once the table of measured values of link quality for each of the plurality of beam forming directions of the transmitting node and the receiving node has been determined, the next act is to determine which of these measure values of link quality correspond with different micro-routes. That is, some of these measure values could correspond with a different micro-route, or some of the measured values could correspond with a side-lobe of a common micro-route. It is desirable to determine which of the measure value correspond with micro-routes and which correspond with side-lobes because different side-lobes of a main lobe of a micro-route are highly correlated with the main lobe. Accordingly, if the main lobe falters (reduced signal quality causing a sensed condition) or is no long available, then the side-lobes of that micro-route will typically not be available either. As previously described, at least some embodiments include identifying an alternate micro-route that can be used if a selected micro-route no longer performs as well as desired or fails.

One way to determine whether a measured value of signal quality corresponds with another micro-route or as a side lobe of a micro-route is to determined where the side lobes should be located in, for example, the table of FIG. 10. The following discussion directed to lobes and expected amplitude (measured) of side lobes can be used by at least some embodiments to distinguish between side lobe of a main lobe, and alternate (different) micro-routes.

Figure 11:
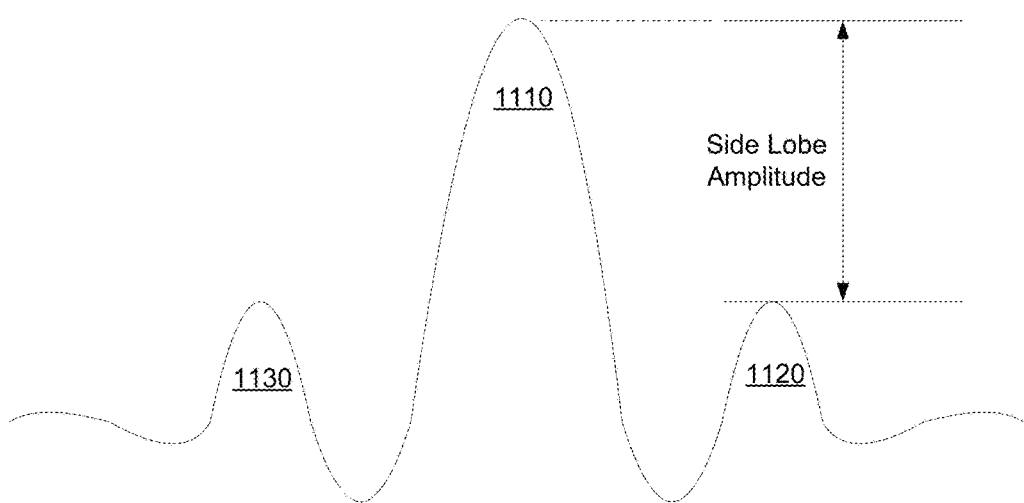
FIG. 11 shows a primary lobe and side lobes of a beam-formed signal, according to an embodiment.

FIG. 11 shows a primary lobe 1110 and side lobes 1120, 1130 of a beam-formed signal, according to an embodiment. As will be described, expected measured values of the side lobes (such as shown in FIG. 11) of the primary lobe of the beam formed transmitted signal can be used to distinguish between different micro-routes and side lobes of the table of FIG. 10. That is, typically a side-lobe of a primary lobe has an amplitude having a power level that is less than the amplitude of the power level of the primary lobe by an expected value. If the observed value of the amplitude is greater than the expected value, then it can be concluded that a potentially observed side lobe is actually a different micro-route not a side lobe.

FIG. 12 shows a table of measured qualities of micro-routes, and further shows measured qualities that could represent a primary lobe and side lobes of a beam-formed signal, according to an embodiment. The side lobes of the beam setting direction 6 of the first (transmitting) node will tend to fall within the same column. That is, the side lobes of the micro-route corresponding to the measure link quality of V1 will tend to be located within the same column of the table as the measured value of V1. For example, the measured link qualities of V4 and V5 may be initially categorized as corresponding with side lobes because they are located in the same column as the micro-route of V1.

Further, the side lobes of the beam setting direction 6 of the first (transmitting) node will tend to fall within the same column. That is, the side lobes of the micro-route corresponding to the measure link quality of V1 will tend to be located within the same row of the table as the measured value of V1. For example, the measured link qualities of V2 and V3 may be initially categorized as corresponding with side lobes because they are located in the same row as the micro-route of V1.

Further, for an embodiment, the measured values of V6, V7, V8, V9, V10, V11, V12, V13 are categorized as corresponding with different micro-routes than the micro-route of V1 because these value are all located within the table of FIG. 12 and FIG. 10 at different columns and rows as the V1. Note, however, that some of these values maybe side lobes of the others of these values.

Figure 13:
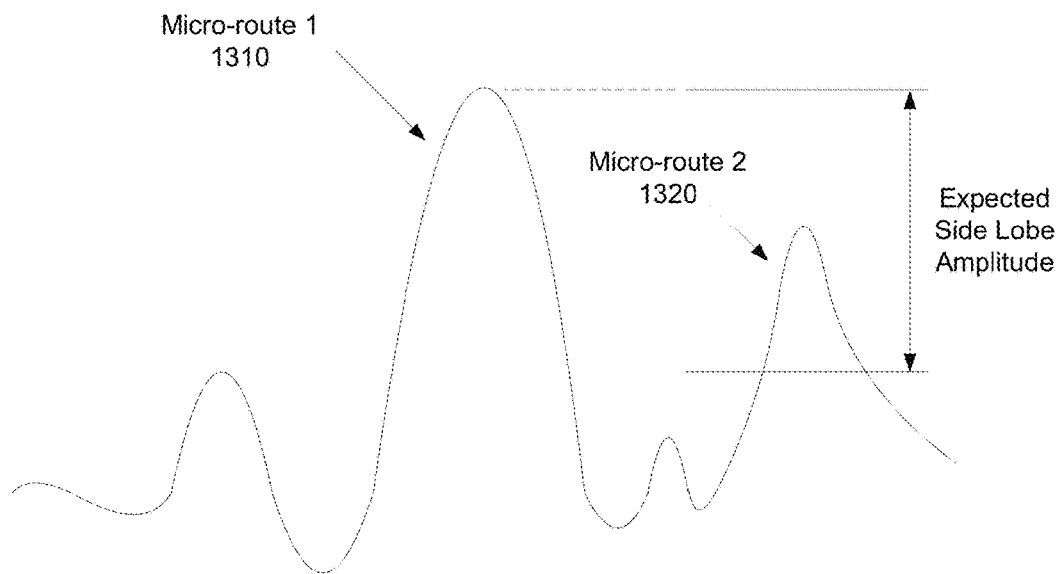
FIG. 13 shows a primary lobe and side lobes of a beam-formed signal, and further shows a possible signal of a separate micro-route, according to an embodiment.

FIG. 13 shows a primary lobe and side lobes of a beam-formed signal, and further shows a possible signal of a separate micro-route, according to an embodiment. As shown, the micro-route 1320 could be confused as a side lobe of the micro-route 1310. However, the amplitude of the micro-route 1320 is too large to be considered a side lobe. That is, a side lobe of the micro-route 1310 would be expected to have an amplitude (measured signal quality) that is lower than the amplitude of the micro-route 1310 by the expected side lobe amplitude threshold. However, the amplitude of the micro-route 1320 is greater than this amount, and accordingly, can be designated as a separate micro-route.

FIG. 14 shows a first table that lists a measured link quality for each of five micro-routes, and lists a level of correlation with a first micro-route take at a time T1, a second table that lists a measured link quality for each of the five micro-routes, and lists a level of correlation with a first micro-route take at a time T2, according to an embodiment. As previously described, as the conditions of the wireless network changes, the level of correlation between micro-routes can change. For at least some embodiments, the level of correlation between the different identified micro-routes is monitored (measured) over time. Further, conditions can be sensed to determine whether to re-measure the level of correlation between micro-routes.

For an embodiment, determining the level of correlation between a first micro-route and a second micro-route includes determining how much as event or sensed condition effects both of the first micro-route and the second route. The more correlated the first micro-route is to the second micro-route, the more similar the effect the event or the sensed condition has on both of the first micro-route and the second micro-route. Further, the less correlated the first micro-route is to the second micro-route, the less the effect the event or the sensed condition has on both of the first micro-route and the second micro-route.

As previously described, for at least some embodiments, if a link condition (for example, a failure of the link) of a micro-route being used for wireless communication is sensed or determined, a new micro-route is selected based on the level of correlation of the new micro-route with the micro-route being used. For an embodiment, the less correlated the new micro-route is with the micro-route being used, the more likely the chances are that the new micro-route will be selected if the link condition (for example, a failure of the link) of a micro-route being used for wireless communication is sensed or determined.

As previously described, for at least some embodiments, the micro-routes between the transmitting node and the receiving node are monitored over time. That is, the performance of the micro-routes is re-characterized repeatedly over time. For at least some embodiments, the level of correlation between the different micro-routes is determined by determining variations in the performance (for example, measured link quality) between the different micro-routes over the repeated characterizations. That is, the correlation determination includes determining whether the performance of the different micro-routes changes similarly or differently over time. The more correlated different micro-routes are, the more similar the variations in the performance of the micro-routes. The less correlated the different micro-routes are, the less similar the variation in the performance of the micro-routes. Statistical processes can be used to determine the similarity or difference between different micro-routes over time by comparing the performance of the different micro-route over the repeated characterization of the performance of the different micro-routes over time.

As previously described, for at least some embodiments, the correlation between different micro-routes is determined by determining how the performance of the different micro-routes is affected by a change in a network condition. Exemplary network conditions include the introduction or the elimination of one or more interfering signals, a change in network topology (such as, the addition or removal of a network node, or the change of location of a network node), a change in the environment around or surrounding the wireless network (such as, movement of, addition of, or subtraction of a physical object). If the different micro-routes are correlated, then the change in the network condition will change the performance of the different micro-routes similarly. If the different micro-routes are not correlated, then the change in the network condition will change the performance of the different micro-routes differently. Statistical processes can be used to determine the similarity or difference between different micro-routes with changes in the network conditions.

For an embodiment a matrix is generated wherein the elements of the matrix indicate the correlation between a micro-route represented by row Ii with micro-route represented by column j.

For an embodiment, the correlation between a first micro-route and a second micro-route is determined based on the angular difference between the AoD at the transmitter for the first micro-route and for the second micro-route, and/or the angular difference between the AoA at the receiver for the first micro-route and for the second micro-route. That is, the correlation between the first micro-route and the second micro-route is determined as a function of the difference between the AoD at the transmitter for the first micro-route and the AoD at the transmitter for the second micro-route, and/or as a function of the difference between the AoD at the transmitter for the first micro-route and the AoD at the transmitter for the second micro-route Correlated Micro-Routes and Back Up Micro-Routes For at least some embodiments, two micro-routes are considered correlated if:

$$Pr(uR[k]=1|uR[i]=0) \leq \rho Pr(uR[k]=1)$$

where ρ is the correlation detection threshold. An exemplary ρ is: ρ=0.7.

A useful metric to determine a back-up micro-route $k^* = \arg\max Pr(uR[k]=1|uR[i]=0)$.

For an embodiment, a set of top independent micro-routes for micro-route i is given as:

$$S_i = \{k_1 \ldots k_N\}$$

such that:

$$Pr(uR[k_1]=1|uR[i]=0) \geq Pr(uR[k_2]=1|uR[i]=0) \ldots \geq Pr(uR[k_N]=1|uR[i]=0)$$

and $$Pr(uR[k_N]=1|uR[i]=0) \geq Pr((uR[j]=1|uR[i]=0)) \forall j \notin S_i.$$

When a set of micro-routes is communicated to the link, the link has more flexibility in determining the best back-up from the set based on the recent channel conditions:

Another metric to determine a back-up micro-routes is solely based on the marginal distribution:

$$k^* = \arg\max Pr(uR[k]=1)$$

For at least some embodiments, the transmitter of the link communicates the list of back-up micro-routes to its receiver. Further instead of solely relying on the E2E (end-to-end) statistics at, for example, a central controller, the backup micro-route can be determined based on a weighted combination of one or more of E2E computation of conditional probability, the current capacity of the micro-route (at the link level), an angular distance to the existing micro-route (the farther the better). Note that each of the metrics individually is one of the special cases of the weighted metric.

Time Correlation

For at least some embodiments, another important statistical analysis is the correlation of micro-route across time. This analysis can deduce some of the following ON-OFF behavior of micro-routes. First, distribution nodes near, for example, a traffic intersection undergo a periodic pattern in which a few micro-routes are blocked or created during a finite time window. For example, at an intersection depending on the lights, the traffic can go parallel/perpendicular to the direction of the link. Second, bus parking during night.

To compute the probabilities, at least some embodiments include filtering observations based on the time mask. Based on the initial observations, a controller can trigger time-specific procedures to confirm or reject the hypothesis. For example, when the computed correlation is close to the threshold, the controller can trigger a link level procedure using BRP fields to compute relative magnitude and phase.

Figure 15:
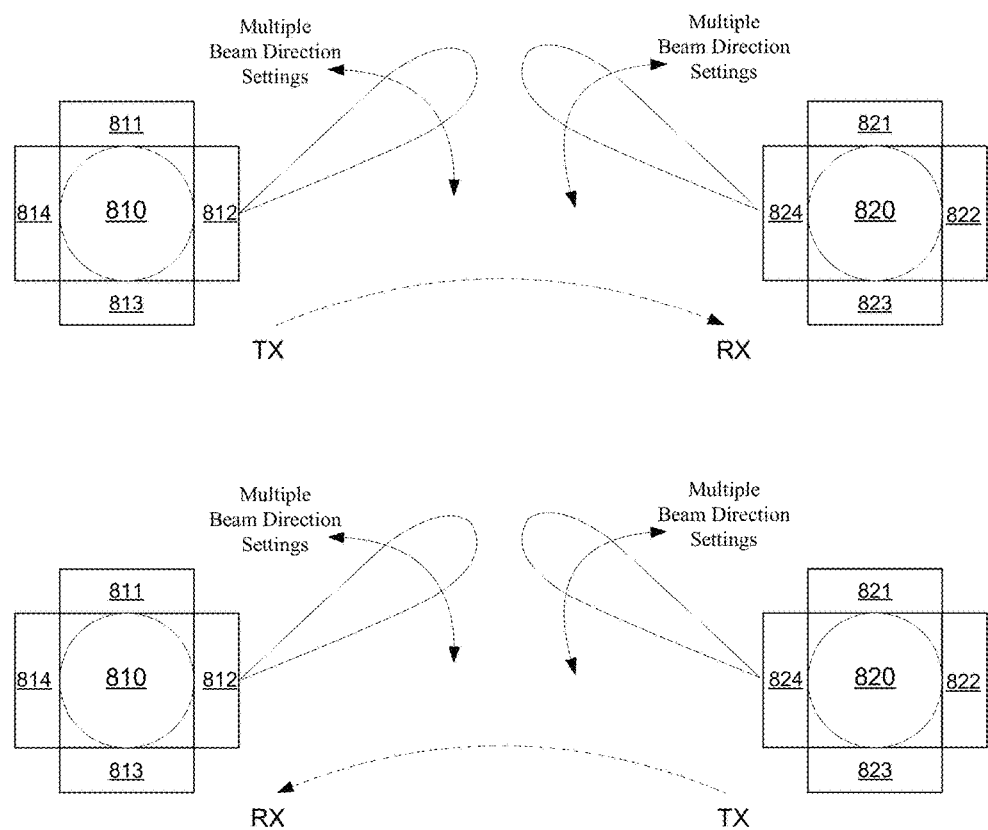
FIG. 15 shows a first node and a second node of a wireless network, wherein micro-routes between the first node and the second node are characterized in two transmit and receive directions, according to an embodiment.

FIG. 15 shows a first node and a second node of a wireless network, wherein micro-routes between the first node and the second node are characterized in two transmit and receive directions, according to an embodiment. That is, FIG. 8B describes characterizing the micro-links while the node 810 is transmitting and the node 820 is receiving. However, as shown in FIG. 15, the relationship between the nodes 810, 820 can be reversed during the characterization process.

For an embodiment, a matrix or table of measured qualities of micro-routes similar to the table of FIG. 10 is generated in both transmit and receive direction, resulting in more than one matrix or table. That is, for example, a matrix or table of measured qualities of micro-routes is generated when the node 810 is transmitting and the node 820 is receiving, and another matrix or table of measured qualities of the micro-routes is generated when the node 810 is receiving and the node 820 is transmitting. For an embodiment, the one or more matrices of the qualities of the micro-routes are combined.

For an embodiment, combining the matrices that are generated in the two different link directions include identifying clusters that are common to both of the matrices, and only including the common clusters within the combined matrix. That is, clusters of one matrix that are not also within the other matrix are eliminated from the combined matrix.

Figure 16:
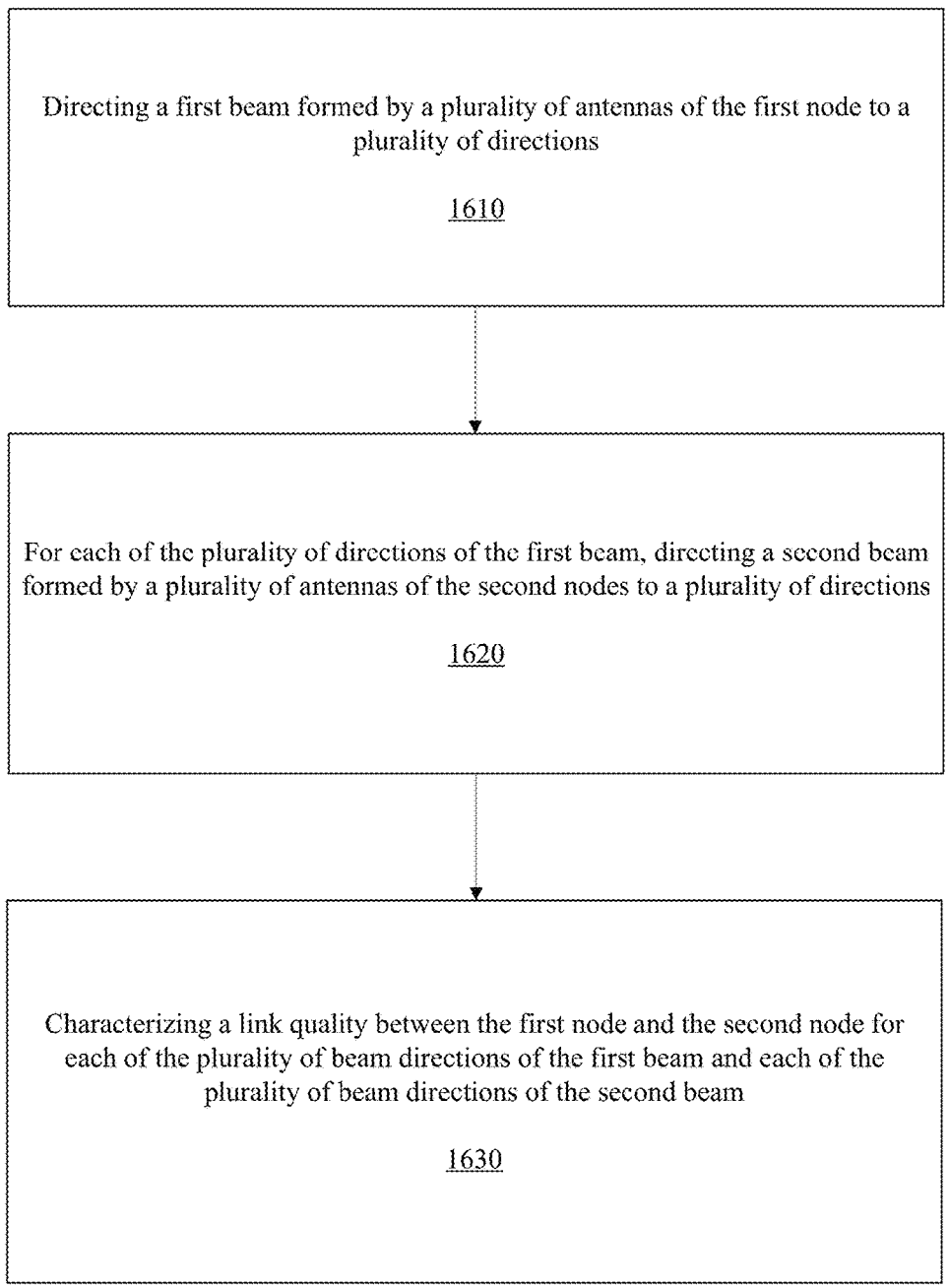
FIG. 16 is a flow chart that includes acts of a method of characterizing micro-links between a first node and a second node, according to an embodiment.

FIG. 16 is a flow chart that includes acts of a method of characterizing micro-links between a first node and a second node, according to an embodiment. A first step 1610 includes directing a first beam formed by a plurality of antennas of the first node to a plurality of directions. A second step 1620 includes directing a second beam formed by a plurality of antennas of the second nodes to a plurality of directions for each of the plurality of directions of the first beam. A third step 1630 includes characterizing a link quality between the first node and the second node for each of the plurality of beam directions of the first beam and each of the plurality of beam directions of the second beam.

For at least some embodiments, characterizing the link quality includes determining whether the link quality is better than a threshold. For at least some embodiment, a known signal (that is, characteristics of the signal, such as, the transmit signal power level) is transmitted from one of the first node or the second node, and received at the other of the first or second node. For an embodiment, the received signal strength of the received signal indicates the link quality of the micro-route. For an embodiment, only link qualities better than a threshold are recorded and utilized.

At least some embodiments further include forming a matrix that includes the characterized link quality for each of the each of the plurality of beam directions of the first beam and each of the plurality of beam directions of the second beam. For an embodiment, the matrix includes entries that represent 2 dimensions of space as defined by the directions of the first beam and the directions of the second beam. Further, for an embodiment, the matrix includes entries that represent 3 dimensions of space.

At least some embodiments further include identifying one or more clusters of characterized link qualities that include characterized link qualities greater than a threshold.

At least some embodiments further include classifying the one or more clusters. As previously described, for at least some embodiments the one or more clusters are classified as at least one of side lobes or micro-routes.

At least some embodiments further include determining a level of correlation between each of the micro-routes.

At least some embodiments further include monitoring link conditions between the first node and the second node, and re-characterizing at least a subset of the one or more micro-routes between a first node and a second node if the monitored link conditions are determined to change by more than a threshold. For an embodiment, detected changes in signal qualities of signals communicated between the first node and the second node are used for determining when to re-characterize the micro-routes between the first node and the second node.

Figure 17:
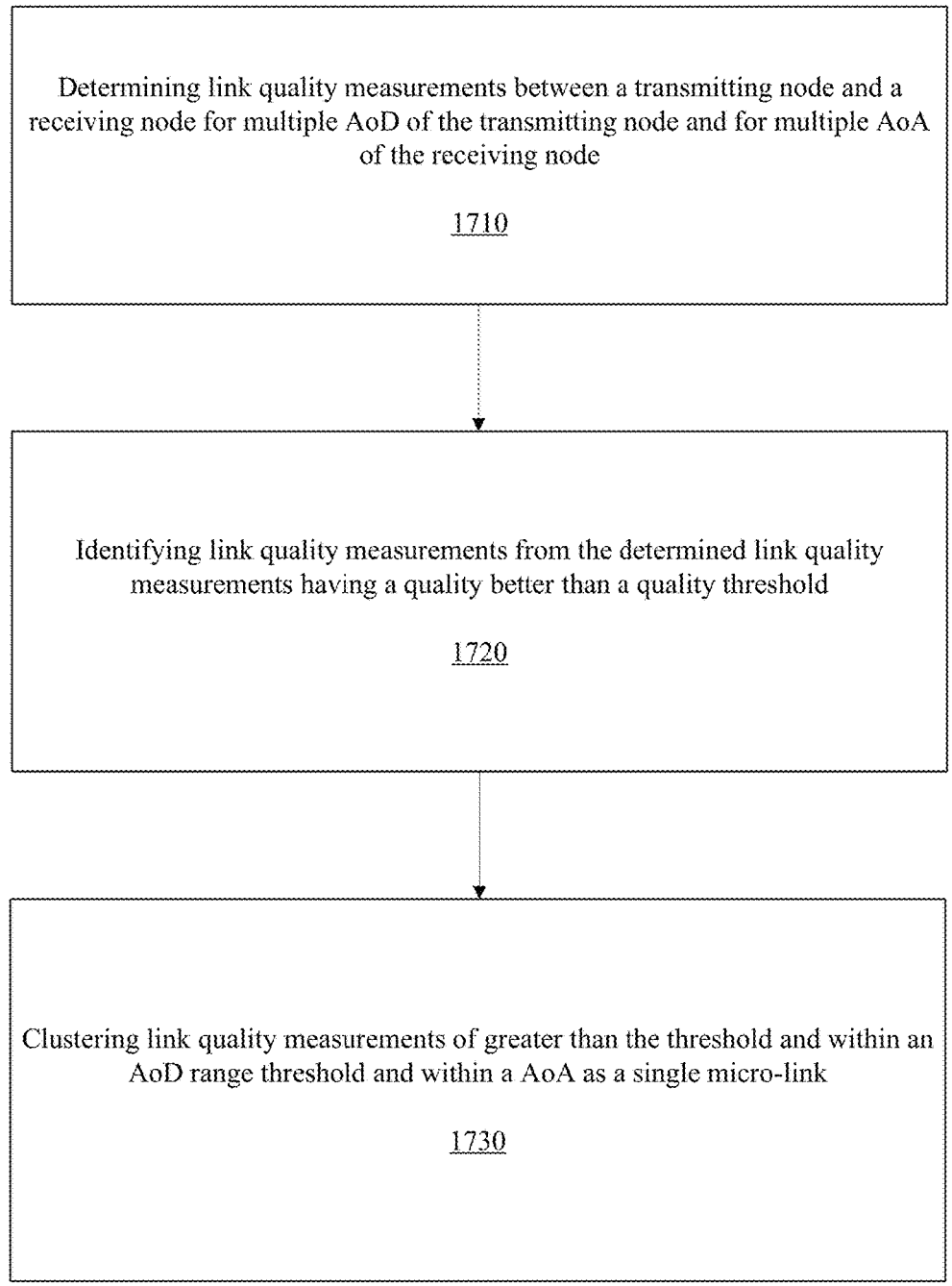
FIG. 17 is a flow chart that includes acts of a method of clustering measured signal qualities of micro-routes, according to an embodiment.

FIG. 17 is a flow chart that includes acts of a method of clustering measured signal qualities of micro-routes, according to an embodiment. A first step 1710 includes determining link quality measurements between a transmitting node and a receiving node for multiple AoD of the transmitting node and for multiple AoA of the receiving node. A second step 1720 includes identifying link quality measurements from the determined link quality measurements having a quality better than a quality threshold. A third step 1730 includes clustering link quality measurements of greater than the threshold and within an AoD range threshold and within an AoA as a single micro-link. That is, as shown in FIG. 9A, a single micro-route may be formed between the transmitting node and the receiving nodes for a small (threshold) range of variations of the AoD and AoA. For an embodiment, the measured link qualities for small (less than a threshold) of variations of AoD and AoA having a link quality better than the quality threshold are clustered, and designated as a single micro-route. Once clustered, the described embodiment further includes classifying the different identified clusters as a side-lobes if each other or as separate micro-links.

Figure 18:
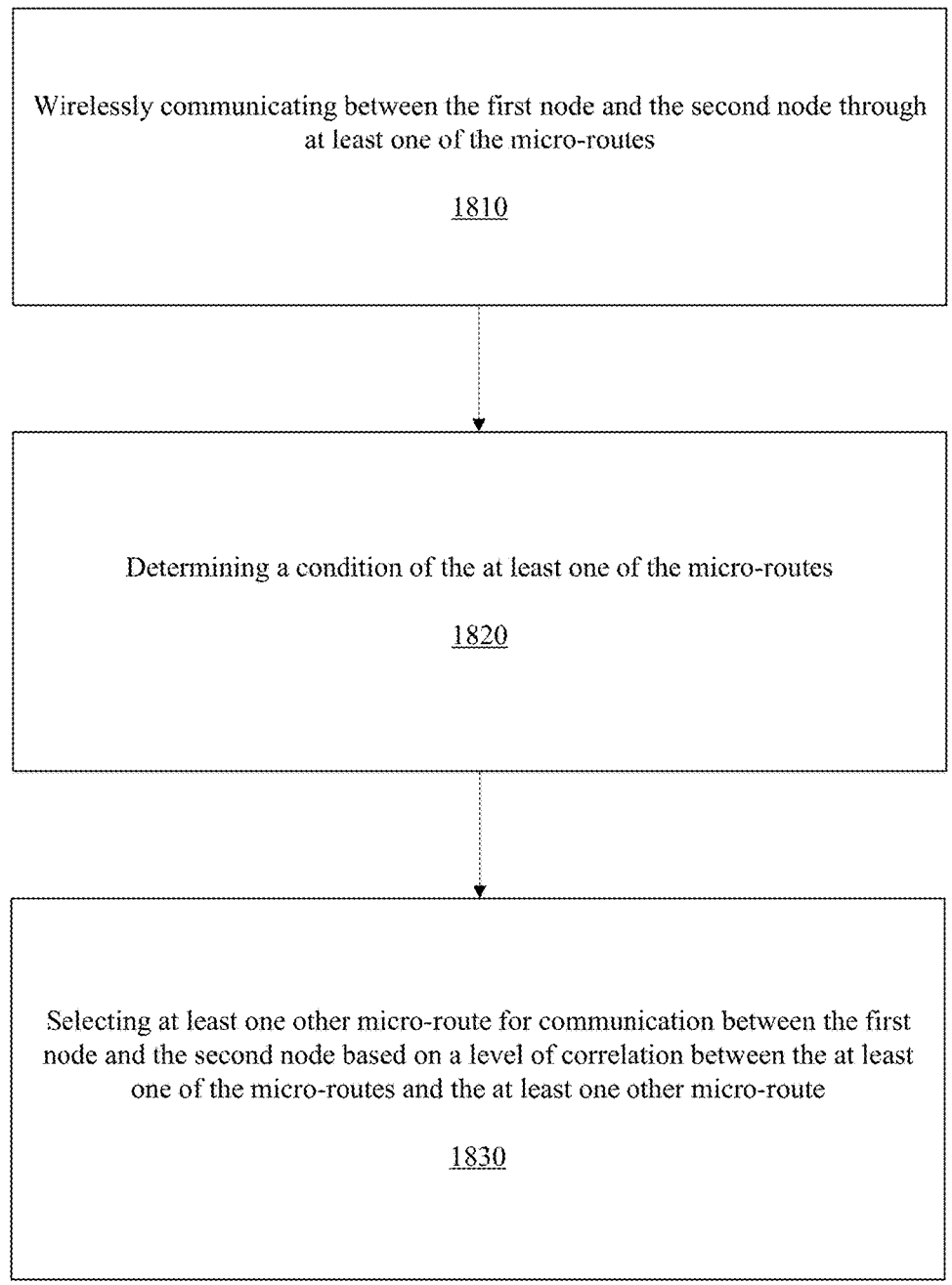
FIG. 18 is a flow chart that includes acts of a method selecting micro-links for communication between a first node and a second node of a wireless network, according to an embodiment.

FIG. 18 is a flow chart that includes acts of a method selecting micro-links for communication between a first node and a second node of a wireless network, according to an embodiment. A first step 1810 includes wirelessly communicating between a first node and a second node through a wireless link formed by at least one micro-route. A second step 1820 includes determining a condition of the at least one micro-route. For an embodiment, the condition of the at least one micro-route includes a quality of the micro-route. For an embodiment, determining the condition includes transmitting a signal through the micro-link and determining a received signal quality or a receive signal amplitude at the receiving node. For an embodiment, if the quality or amplitude of the receive signal is below a threshold, then the micro-route condition is determined to be a link failure, and a new or different micro-route is selected because of the detected failure of the at least one micro-route. For at least some embodiments, the signal quality includes a measurement of at least one of SNR (signal to noise ratio), PER (packet error rate), or BER (bit error rate) of signals communicated from the transmitting node to the receiving node through the micro-route.

A third step 1830 includes selecting at least one other micro-route for communication between the first node and the second node based on a level of correlation between the at least one micro-route and the at least one other micro-route. As previously described, the correlation between different micro-routes can be monitored over time. For at least some embodiments, the correlations between different micro-routes is stored, and retrieved when a new micro-route is to be selected due to the failure (sensed condition) of a micro-route being used to communication information between the transmitting node and the receiving node.

For at least some embodiment, the at least one micro-route and the at least one other micro-route are selected from a plurality of predetermined micro-routes. For an embodiment, the predetermine micro-routes are determined by characterizing one or more micro-routes between a first node and a second node. For example, for an embodiment, the one or more micro-routes between the first node and the second node are determined through a characterization process, and stored in memory. The at least one micro-route is accessed from memory and used for wirelessly communicating between the first node and the second node. Upon detecting a condition, such as, failure of the at least one micro-route, the at least one other micro-route is retrieved from memory, and selected for wireless communication between the first node and the second node based on the level of correlation (typically, the least correlated, or correlated less than a threshold or desired amount) between the at least one micro-route and the at least one other micro-route.

As previously described, for an embodiment, characterizing one or more micro-routes between a first node and a second node includes directing a first beam formed by a plurality of antennas of the first node to a plurality of directions, directing a second beam formed by a plurality of antennas of the second nodes to a plurality of directions for each of the plurality of directions of the first beam, and characterizing a link quality between the first node and the second node for each of the plurality of beam directions of the first beam and each of the plurality of beam directions of the second beam. For at least some embodiment, the characterized one or more micro-routes are stored in the memory.

Pattern Detection

Figure 19:
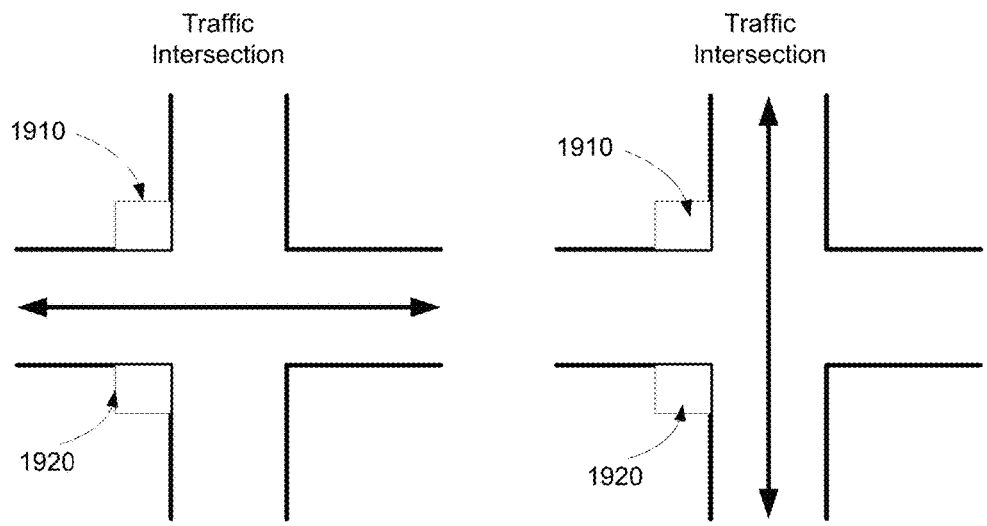
FIG. 19 shows a transmitting node and a receiving node located proximate to a traffic intersection, and implementation of pattern detection that is used for micro-route characterization and selection, according to an embodiment.

FIG. 19 shows a transmitting node 1910 and a receiving node 1920 located proximate to a traffic intersection, and implementation of pattern detection that is used for micro-route characterization and selection, according to an embodiment. For an embodiment, the nodes 1910, 1920 are connected through one or more networks to an upstream cloud server. Accordingly, the cloud server performs or has access to the characterization and selection of micro-routes between the nodes 1910, 1920. For an embodiment, collected information relating to the characterization and selection of micro-routes is used for determining patterns in operations and changes in the environmental around the nodes 1910, 1920. For example, a bus creating/blocking some micro-routes during a particular time window can be mined out of data of the collected information. Further, from the micro-route reports it is possible to classify whether a link (of the micro-routes) lies at a busy road with frequent environmental changes or in a quite street. Based on the classification, different parameters for link adaptation can be selected. For example, based on the periodic micro-route training, it can be deduced whether the link is undergoing more frequent fading/pole sway/foliage sway/blockage. Based on the classification, conservative or aggressive parameters can be set. Further, the micro-route training can be adaptive based upon sensed conditions of the wireless network.

Cloud Server and Node Controller

Figure 20:
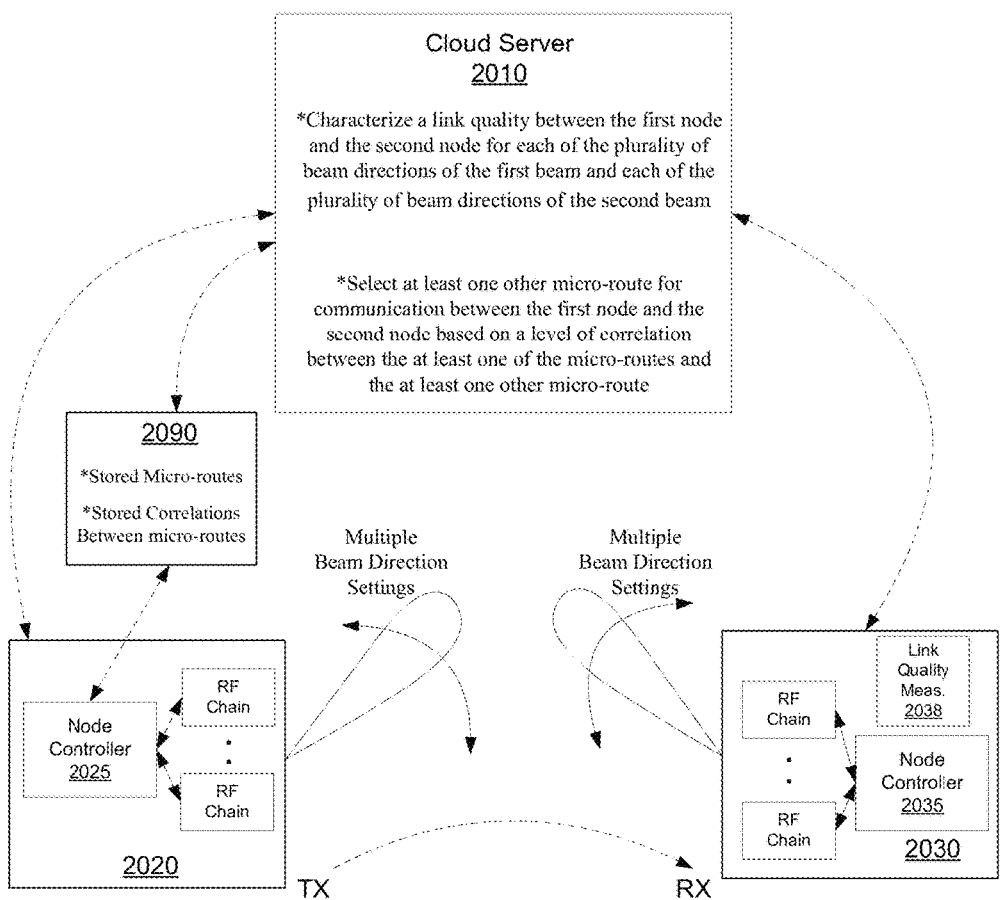
FIG. 20 shows a transmitting node, a receiving node, and a cloud server, according to an embodiment.

FIG. 20 shows a transmitting node 2020, a receiving node 2030, and a cloud server 2010, according to an embodiment. As shown, the transmitting node 2020, and the receiving node 2030 are connected to the cloud server 2010. This connection can be through one or more networks that provide a communication path between the cloud server 2010 and the nodes 2020, 2030.

As previously described, the cloud server 2010 can be connected to many different nodes of the wireless network, and can collect information related to the nodes of the wireless network. For an embodiment, the cloud server 2010 performs at least one of the determination of conditions of one or more one micro-routes between the nodes, or selection one or more different micro-routes for communication between the first node and the second node based on a level of correlation between the one or more micro-routes and the one or more different micro-routes. For an embodiment, the cloud server 2010 performs the characterization of one or more micro-routes between a first node and a second node.

For at least some embodiments, the cloud server 2010 further performs at least one of the clustering of the measured link qualities into micro-routes, classifying the micro-routes, and determining a level of correlation between the identified micro-routes.

The transmitting node 2020 includes multiple RF (radio frequency) chains which are connected to multiple antennas of the transmitting node 2020. As previously described, the multiple antennas generate a directional beam which is directionally controlled, for example, by controlling the amplitude and phase of the signals transmitted by the multiple antennas.

For at least some embodiments, a node controller 2025 of the transmitting node and/or the cloud server 2010 aid in the characterization and determination of micro-route available for wireless communication between the transmitting node 2020 and the receiving node 2030. Once the micro-routes have been characterized and determined, the micro-routes may be stored in memory 2090.

Further, the node controller 2025 of the transmitting node and/or the cloud server 1310 aid in determination of the correlation between the micro-route available for wireless communication between the transmitting node 2020 and the receiving node 2030. Once the correlations between the micro-routes have been determined, the correlations may be stored in memory 2090.

The node controller 2025 of the transmitting node 2020 can access the stored micro-routes from the memory 2090 when determining which micro-routes to utilize for wirelessly communicating with the receiving node 2030. Further, the node controller 2025 of the transmitting node 2020 can access the stored correlations between the micro-routes from the memory 2090 when determining which micro-routes to select upon determining that the present micro-route being used satisfies a condition (such as, a failure in performance).

The receiving node 2030 also includes multiple RF chains for the multiple antennas of the receiving node 2030. For an embodiment, the receiving node 2030 preforms link quality measurements 2038 during the determination and characterization of the micro-links between the transmitting node 2020 and the receiving node 2030. For an embodiment, after the receiving node 2030 preforms link quality measurements 2038, the link quality measurements 2038 are stored in the memory 2090 for future access. Further, for at least some embodiments, the correlation determinations between the characterized micro-links are stored in the memory 2090 as well.

Embodiments according to the invention are in particular disclosed in the attached claims directed to a method and a system, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a method may comprise wirelessly communicating between a first node and a second node through a wireless link formed by at least one micro-route, determining a condition of the at least one micro-route, and selecting at least one other micro-route for communication between the first node and the second node based on a level of correlation between the at least one micro-route and the at least one other micro-route after determining the condition.

A node may especially be any kind of connection point, redistribution point or communication endpoint, as for example a data communication equipment (e.g. modem, hub, bridge, switch) or a data terminal equipment (e.g. digital telephone handset, printer, host computer, router, workstation or server). In particular a node may be a wireless router and/or a wirelessly connected mobile communication device.

Determining the level of correlation between the first micro-route and the second micro-route may include determining how much an event or sensed condition effects both of the first micro-route and the second route, and the more similar the effect the event or sensed condition has on both, the more correlated they are. As previously described, for at least some embodiments, the micro-routes between the transmitting node and the receiving node are monitored over time. That is, the performance of the micro-routes is re-characterized repeatedly over time. For at least some embodiments, the level of correlation between the different micro-routes is determined by determining variations in the performance (for example, measured link quality) between the different micro-routes over the repeated characterizations. That is, the correlation determination includes determining whether the performance of the different micro-routes changes similarly or differently over time. The more correlated different micro-routes are, the more similar the variations in the performance of the micro-routes. The less correlated the different micro-routes are, the less similar the variation in the performance of the micro-routes. Statistical processes can be used to determine the similarity or difference between different micro-routes over time by comparing the performance of the different micro-route over the repeated characterization of the performance of the different micro-routes over time.

The condition may be one or more of the following: the performance; the introduction or the elimination of one or more interfering signals; a change in network topology; a change in the physical environment around or surrounding the wireless network; the failure of a link; the signal quality.

In an embodiment according to the invention, a method may comprise characterizing a plurality of micro-routes between a first node and a second node, wherein the plurality of micro-routes includes the at least one micro-route and the at least one other micro-route, comprising directing a first beam formed by a plurality of antennas of the first node to a plurality of directions, for each of the plurality of directions of the first beam, directing a second beam formed by a plurality of antennas of the second nodes to a plurality of directions, and characterizing a link quality between the first node and the second node for each of the plurality of beam directions of the first beam and each of the plurality of beam directions of the second beam.

Characterizing the link quality may comprise determining whether the link quality is better than a threshold.

In an embodiment according to the invention, a method may comprise forming a matrix that includes the characterized link quality for each of the each of the plurality of beam directions of the first beam and each of the plurality of beam directions of the second beam.

In an embodiment according to the invention, a method may comprise identifying one or more clusters of characterized link qualities that include characterized link qualities greater than a threshold.

In an embodiment according to the invention, a method may comprise classifying the one or more clusters.

The one or more clusters may be classified as at least one of side lobes or micro-routes.

In an embodiment according to the invention, a method may comprise determining a level of correlation between each of the micro-routes.

The level of correlation may be determined based on the difference in AoD (angle of departure) at the transmitting node and AoA (angle of arrival) at the receiving node between each of the micro-routes.

In an embodiment according to the invention, a method may comprise monitoring link conditions between the first node and the second node, and re-characterizing at least a subset of the plurality of micro-routes between a first node and a second node if the monitored link conditions are determined to change by more than a threshold.

An upstream cloud server connected to the first node and the second node may perform a portion of at least one of the characterizing one or more micro-routes between the first node and the second node, or the selecting at least one other micro-route for communication between the first node and the second node.

In an embodiment according to the invention, a wireless network may comprise a first node, a second node, wherein the first node wirelessly communicates with the second node through a wireless link formed by at least one micro-route, and a controller, wherein the controller is operative to determine a condition of the at least one micro-route, and select at least one other micro-route for communication between the first node and the second node based on a level of correlation between the at least one micro-route and the at least one other micro-route after determining the condition.

In an embodiment according to the invention, a wireless network may comprise a first node, a second node, wherein the first node wirelessly communicates with the second node through a wireless link formed by at least one micro-route, and a controller, wherein the controller is operative to determine a condition of the at least one micro-route, select at least one other micro-route for communication between the first node and the second node based on a level of correlation between the at least one micro-route and the at least one other micro-route after determining the condition.

Determining the level of correlation between the first micro-route and the second micro-route may include determining how much an event or sensed condition effects both of the first micro-route and the second route, and the more similar the effect the event or sensed condition has on both, the more correlated they are.

The condition may be one or more of the following: the performance; the introduction or the elimination of one or more interfering signals; a change in network topology; a change in the physical environment around or surrounding the wireless network; the failure of a link; the signal quality.

The controller may be operative to characterize a plurality of micro-routes between a first node and a second node, wherein the plurality of micro-routes includes the at least one micro-route and the at least one other micro-route, comprising directing a first beam formed by a plurality of antennas of the first node to a plurality of directions, for each of the plurality of directions of the first beam, directing a second beam formed by a plurality of antennas of the second nodes to a plurality of directions, and characterize a link quality between the first node and the second node for each of the plurality of beam directions of the first beam and each of the plurality of beam directions of the second beam.

Characterizing the link quality may comprise determining whether the link quality is better than a threshold.

The controller may be operative to form a matrix that includes the characterized link quality for each of the each of the plurality of beam directions of the first beam and each of the plurality of beam directions of the second beam.

The controller may be operative to identify one or more clusters of characterized link qualities that include characterized link qualities greater than a threshold.

The controller may be operative to classify the one or more clusters.

The one or more clusters may be classified as at least one of side lobes or micro-routes.

The controller may be operative to determine a level of correlation between each of the micro-routes.

The controller may be operative to monitor link conditions between the first node and the second node, and re-characterize at least a subset of the one or more micro-routes between a first node and a second node if the monitored link conditions are determined to change by more than a threshold.

In a further embodiment according to the invention, one or more computer-readable non-transitory storage media embody software that is operable when executed to perform a method according to the invention or any of the above mentioned embodiments.

In a further embodiment according to the invention, a system comprises: one or more processors; and at least one memory coupled to the processors and comprising instructions executable by the processors, the processors operable when executing the instructions to perform a method according to the invention or any of the above mentioned embodiments.

In a further embodiment according to the invention, a computer program product, preferably comprising a computer-readable non-transitory storage media, is operable when executed on a data processing system to perform a method according to the invention or any of the above mentioned embodiments.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special-purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, or optical disks. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special-purpose logic circuitry.

From the foregoing, it will be appreciated that specific embodiments of the invention have been described herein for purposes of illustration, but that various modifications may be made without deviating from the scope of the invention. Accordingly, the invention is not limited except as by the appended claims.

Although specific embodiments have been described and illustrated, the embodiments are not to be limited to the specific forms or arrangements of parts so described and illustrated. The described embodiments are to only be limited by the claims.

We claim:

1. A wireless communication network, comprising:
   a transmitting node and a receiving node configured to transmit and receive packets between the transmitting node and the receiving node through one or more of a plurality of predetermined micro-routes, wherein each of the plurality of predetermined micro-routes is determined by a transmit beamforming direction and a receive beamforming direction, and wherein each of the plurality of predetermined micro-routes includes a single wireless hop link between the transmitting node and the receiving node with no intermediate nodes;
   wherein the transmitting node is configured to:
   retrieve a first micro-route of the plurality of predetermined micro-routes;
   transmit packets in a first transmit beamforming direction associated with the first micro-route between the transmitting node and the receiving node;
   transmit packets including one or more training signals in a second transmit beamforming direction associated with a second micro-route of the plurality of predetermined micro-routes that is different than the first transmit beamforming direction associated with the first micro-route; and
   receive feedback from the receiving node indicating that the second micro-route corresponding with a transmit/receive beamforming pair of the second transmit beamforming direction and a second receive beamforming direction provides a better communication link than a transmit/receive beamforming pair of the first transmit beamforming direction and a first receive beamforming direction of the first micro-route, wherein the receiving node decodes a header of a packet received from the transmitting node, and determines a number of training signals included within the packet, and a number of receive beamforming directions of the receiving node for the number of training signals.

2. The wireless communication network of claim 1, wherein the transmitting node is further configured to change a transmit beamforming direction of the transmitting node to the second transmit beamforming direction associated with the second micro-route.

3. The wireless communication network of claim 1, further comprising the transmitting node adaptively transmitting packets that include one or more training signals in different transmit beamforming directions based on at least one of a link quality between the transmitting node and the receiving node, a detected change in an environmental condition of the wireless communication network, a detected change in packet traffic of the wireless communication network, or a monitored condition of the wireless communication network.

4. The wireless communication network of claim 1, wherein a transmit packet includes a plurality of training signals, and wherein the transmitting node is further configured to:
   retrieve two or more micro-routes of the plurality of predetermined micro-routes;
   transmit a first training signal of the plurality of training signals within the transmit packet in a first transmit beamforming direction associated with a first micro-route;

transmit a second training signal of the plurality of training signals within the transmit packet in a second transmit beamforming direction associated with a second micro-route;

receive feedback from the receiving node indicating a communication link quality corresponding with one or more of a transmit/receive beamforming pair of the first transmit beamforming direction and a first receive beamforming direction, a transmit/receive beamforming pair of the second transmit beamforming direction and a second receive beamforming direction.

5. The wireless communication network of claim 4, wherein the transmitting node is further configured to:

receive feedback from the receiving node indicating a communication link quality corresponding with one or more of a transmit/receive beamforming pair of the second transmit beamforming direction and the first receive beamforming direction, a transmit/receive beamforming pair of the second transmit beamforming direction and the second receive beamforming direction.

6. The wireless communication network of claim 1, wherein the transmitting node is further configured to:

transmit a training packet a plurality of times in a single transmit beamforming direction;

receive feedback from the receiving node indicating detection of reception of the training packet in at least one of a plurality of receive beamforming directions.

7. The wireless communication network of claim 1, wherein the transmitting node is further configured to:

transmit a training packet in a plurality transmit beamforming direction;

receive feedback from the receiving node indicating detection of reception of the training packet in a single receive beamforming direction for one or more of the plurality of transmit beamforming directions.

8. The wireless communication network of claim 1, wherein the transmitting node is further configured to:

transmit a first training signal of the plurality of training signals within the at least one transmit packet in a first fined-tuned direction of a transmit beamforming direction associated with a micro-route, wherein the first fine-tune direction deviates a direction of the transmit beamforming direction by a first threshold;

transmit a second training signal of the plurality of training signals within the at least one transmit packet in a second fine-tuned direction of the transmit beamforming direction associated with the micro-route, wherein the second fine-tune direction deviates a direction of the transmit beamforming direction by a second threshold;

receive feedback from the receiving node indicating a communication link quality corresponding with one or more of first fine-tuned direction of the transmit beamforming direction or the second fine-tuned direction of the transmit beamforming direction.

9. The wireless communication network of claim 1, wherein at least one of a central controller or a controller of the transmitting node is operative to:

determine the plurality of predetermined micro-routes comprising:
characterizing a plurality of micro-routes between the transmitting node and the receiving node; and
storing the characterized plurality of micro-routes.

10. The wireless communication network of claim 9, wherein characterizing the plurality of micro-routes between the transmitting node and the receiving node, comprises the upstream controller operative to:

direct a first beam formed by a plurality of antennas of the transmitting node to a plurality of directions;

for each of the plurality of directions of the first beam, direct a second beam formed by a plurality of antennas of the receiving nodes to a plurality of directions;

characterize a link quality between the transmitting node and the receiving node for each of the plurality of beam directions of the first beam and each of the plurality of beam directions of the second beam.

11. A method, comprising:

transmitting, by a transmitting node, transmit packets, and receiving, by a receiving node, receive packets between the transmitting node and the receiving node through one or more of a plurality of predetermined micro-routes, wherein each the plurality of predetermined micro-routes is determined by a transmit beamforming direction and a receive beamforming direction, and wherein each of the plurality of predetermined micro-routes includes a single wireless hop link between the transmitting node and the receiving node with no intermediate nodes;

retrieving, by the transmitting node, a first micro-route of the plurality of predetermined micro-routes;

transmitting, by the transmitting node, packets in a first transmit beamforming direction associated with the first micro-route between the transmitting node and the receiving node;

transmitting, by the transmitting node, packets including one or more training signals in a second transmit beamforming direction associated with a second micro-route of the plurality of predetermined micro-routes that is different than the first transmit beamforming direction associated with the first micro-route; and receiving, by the transmitting node, feedback from the receiving node indicating that the second micro-route corresponding with a transmit/receive beamforming pair of the second transmit beamforming direction and a second receive beamforming direction provides a better communication link than a transmit/receive beamforming pair of the first transmit beamforming direction and a first receive beamforming direction of the first micro-route, wherein the receiving node decodes a header of a packet received from the transmitting node, and determines a number of training signals included within the packet, and a number of receive beamforming directions of the receiving node for the number of training signals.

12. The method of claim 11, further comprising changing, by the transmitting node, a transmit beamforming direction of the transmitting node to the second transmit beamforming direction associated with the second micro-route.

13. The method of claim 11, further comprising adaptively transmitting packets, by the transmitting node, that include one or more training signals in different transmit beamforming directions based on at least one of a link quality between the transmitting node and the receiving node, a detected change in an environmental condition of the wireless communication network, a detected change in packet traffic of the wireless communication network, or a monitored condition of the wireless communication network.

14. The method of claim 11, wherein a transmit packet includes a plurality of training signals, and further comprising:

retrieving, by the transmitting node, two or more micro-routes of the plurality of predetermined micro-routes;

transmitting, by the transmitting node, a first training signal of the plurality of training signals within the transmit packet in a first transmit beamforming direction associated with a first micro-route;

transmitting, by the transmitting node, a second training signal of the plurality of training signals within the transmit packet in a second transmit beamforming direction associated with a second micro-route; and receiving, by the transmitting node, feedback from the receiving node indicating a communication link quality corresponding with one or more of a transmit/receive beamforming pair of the first transmit beamforming direction and a first receive beamforming direction, a transmit/receive beamforming pair of the second transmit beamforming direction and a second receive beamforming direction.

15. The method of claim 14, further comprising:

receiving, by the transmitting node, feedback from the receiving node indicating a communication link quality corresponding with one or more of a transmit/receive beamforming pair of the second transmit beamforming direction and the first receive beamforming direction, a transmit/receive beamforming pair of the second transmit beamforming direction and the second receive beamforming direction.

16. The method of claim 11, further comprising determining the plurality of predetermined micro-routes comprising:

characterizing a plurality of micro-routes between the transmitting node and the receiving node; and storing the characterized plurality of micro-routes.

17. The method of claim 16, wherein characterizing the plurality of micro-routes between the transmitting node and the receiving node, comprises:

directing a first beam formed by a plurality of antennas of the transmitting node to a plurality of directions;

for each of the plurality of directions of the first beam, directing a second beam formed by a plurality of antennas of the receiving nodes to a plurality of directions;

characterizing a link quality between the transmitting node and the receiving node for each of the plurality of beam directions of the first beam and each of the plurality of beam directions of the second beam.

18. A method, comprising:

transmitting, by a transmitting node, transmit packets, and receiving, by a receiving node, receive packets between the transmitting node and the receiving node through one or more of a plurality of predetermined micro-routes, wherein each the plurality of predetermined micro-routes is determined by a transmit beamforming direction and a receive beamforming direction, and wherein each of the plurality of predetermined micro-routes includes a single wireless hop link between the transmitting node and the receiving node with no intermediate nodes;

retrieving, by the transmitting node, a first micro-route of the plurality of predetermined micro-routes;

transmitting, by the transmitting node, packets in a first transmit beamforming direction associated with the first micro-route between the transmitting node and the receiving node;

transmitting, by the transmitting node, packets including one or more training signals in a second transmit beamforming direction associated with a second micro-route of the plurality of predetermined micro-routes that is different than the first transmit beamforming direction associated with the first micro-route; and receiving, by the transmitting node, feedback from the receiving node indicating that the second micro-route corresponding with a transmit/receive beamforming pair of the second transmit beamforming direction and a second receive beamforming direction provides a better communication link than a transmit/receive beamforming pair of the first transmit beamforming direction and a first receive beamforming direction of the first micro-route, transmitting, by the transmitting node, a first training signal of the plurality of training signals within the at least one transmit packet in a first fined-tuned direction of a transmit beamforming direction associated with a micro-route, wherein the first fine-tune direction deviates a direction of the transmit beamforming direction by a first threshold;

transmitting, by the transmitting node, a second training signal of the plurality of training signals within the at least one transmit packet in a second fine-tuned direction of the transmit beamforming direction associated with the micro-route, wherein the second fine-tune direction deviates a direction of the transmitting beamforming direction by a second threshold;

receiving, by the transmitting node, feedback from the receiving node indicating a communication link quality corresponding with one or more of first fine-tuned direction of the transmit beamforming direction or the second fine-tuned direction of the transmit beamforming direction.

* * * * *